United States Patent
Jiang et al.

(10) Patent No.: US 12,484,028 B2
(45) Date of Patent: Nov. 25, 2025

(54) POWER-SAVING SIGNAL DETECTING METHOD, RESOURCE DETERMINING METHOD AND RELATED DEVICES

(71) Applicant: VIVO MOBILE COMMUNICATION CO., LTD., Guangdong (CN)

(72) Inventors: Dajie Jiang, Dongguan (CN); Xiaodong Shen, Dongguan (CN); Xueming Pan, Dongguan (CN); Qianyao Ren, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 924 days.

(21) Appl. No.: 17/389,417

(22) Filed: Jul. 30, 2021

(65) Prior Publication Data
US 2021/0360621 A1    Nov. 18, 2021

Related U.S. Application Data

(63) Continuation of application No. PCT/CN2020/070911, filed on Jan. 8, 2020.

(30) Foreign Application Priority Data

Feb. 2, 2019    (CN) .................. 201910108019.0

(51) Int. Cl.
*H04W 72/0446*    (2023.01)
*H04W 52/02*      (2009.01)
*H04W 76/28*      (2018.01)

(52) U.S. Cl.
CPC ... *H04W 72/0446* (2013.01); *H04W 52/0216* (2013.01); *H04W 52/0235* (2013.01); *H04W 52/0245* (2013.01); *H04W 76/28* (2018.02)

(58) Field of Classification Search
CPC ......... H04W 72/0446; H04W 52/0235; H04W 52/0229; H04W 52/0245; H04W 52/028;
(Continued)

(56) References Cited

U.S. PATENT DOCUMENTS 11,729,857 B2 *  8/2023  Islam ............... H04W 76/28
                                                     370/311
2018/0302889 A1  10/2018  Guo et al.
(Continued)

FOREIGN PATENT DOCUMENTS

CN       108370574 A      8/2018
WO    WO-2018171476 A1    9/2018
(Continued)

OTHER PUBLICATIONS

International Search Report and Written Opinion of the International Searching Authority regarding International Patent Application No. PCT/CN2020/070911, dated Apr. 1, 2020. Translation provided by Bohui Intellectual Property.
(Continued)

*Primary Examiner* — Redentor Pasia
(74) *Attorney, Agent, or Firm* — Harness, Dickey & Pierce, P.L.C.

(57) ABSTRACT

A resource determining method includes: determining a time-domain resource for a target signal according to a target time interval. The target time interval includes at least one of a first time interval, a second time interval, or a third time interval. The first time interval is a time interval between a power-saving signal and a PDCCH associated with the power-saving signal. The second time interval is a time interval between the power-saving signal and a first signal. The third time interval is a time interval between the PDCCH associated with the power-saving signal and the first signal. The first signal is a signal used for downlink
(Continued)

Determine, according to a measured measurement quantity related to a channel condition, whether to decode a power-saving signal — 401 synchronization or RRM measurement or beam management. The target signal includes at least one of the power-saving signal or the first signal.

12 Claims, 6 Drawing Sheets

(58) Field of Classification Search
CPC . H04W 52/0216; H04W 76/28; H04W 24/02; H04W 24/08; Y02D 30/70
See application file for complete search history.

(56) References Cited

U.S. PATENT DOCUMENTS

| | | | |
|---|---|---|---|
| 2019/0387572 A1* | 12/2019 | Nam | H04W 8/24 |
| 2020/0008261 A1* | 1/2020 | Islam | H04W 52/0216 |
| 2020/0145921 A1* | 5/2020 | Zhang | H04W 52/0235 |
| 2020/0178172 A1* | 6/2020 | Thangarasa | H04W 76/28 |
| 2020/0229092 A1* | 7/2020 | Wu | H04W 76/28 |
| 2020/0229093 A1* | 7/2020 | Ahmad | H04W 52/0209 |
| 2020/0275368 A1* | 8/2020 | Puchko | H04W 52/02 |
| 2020/0305200 A1 | 9/2020 | Jiang | |
| 2020/0383054 A1 | 12/2020 | Tang | |
| 2021/0007051 A1* | 1/2021 | Tang | H04W 52/0229 |
| 2021/0051584 A1* | 2/2021 | Cheng | H04W 72/21 |
| 2021/0051589 A1* | 2/2021 | Nam | H04W 52/0216 |
| 2021/0058865 A1* | 2/2021 | Xu | H04W 52/0235 |
| 2021/0144646 A1* | 5/2021 | Xu | H04W 76/28 |
| 2021/0185762 A1* | 6/2021 | Li | H04W 52/0235 |
| 2021/0314866 A1* | 10/2021 | Lee | H04W 52/0229 |
| 2022/0039009 A1* | 2/2022 | Iyer | H04L 5/0098 |
| 2023/0284138 A1* | 9/2023 | Tang | H04W 52/0216 370/311 |

FOREIGN PATENT DOCUMENTS

| | | |
|---|---|---|
| WO | WO-2018201397 A1 | 11/2018 |
| WO | WO-2018204799 A1 | 11/2018 |

OTHER PUBLICATIONS

First Office Action regarding Chinese Patent Application No. 201910108019.0, dated Jan. 25, 2021. Translation provided by Bohui Intellectual Property.
"DL power consumption reduction for eMTC," Samsung, 3GPP TSG RAN WG1 Meeting #93, R1-1806684, dated May 25, 2018.
Supplementary European Search Report regarding Patent Application No. 20749248.9-1216/3920575; PCT/CN2020/070911, dated Feb. 23, 2022.
"3rd Generation Partnership Project; Technical Specification Group Radio Access Network; NR; Study on UE Power Saving (Release 16)," 3GPP TR 38.840 V0.1.0, XP051590958, Nov. 29, 2018.
"RRM measurement on power saving," CATT, 3GPP TSG RAN WG1 Ad-Hoc Meeting 1901, R1-1900346, dated Jan. 25, 2019.
"UE Power saving schemes with power saving signal/channel/procedures," CATT, 3GPP TSG RAN WG1 Ad-Hoc Meeting 1901, R1-1900345, dated Jan. 25, 2019.
"UE Power Saving Scheme with Adaptation," CATT 3GPP RSG RAN WG1 Meeting #AH 1901, R1-1900344, dated Jan. 25, 2019.

* cited by examiner

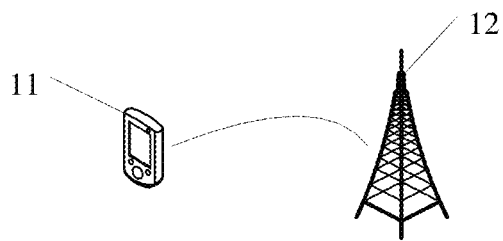

FIG. 3

```
┌─────────────────────────────────────────────┐
│ Determine, according to a measured measurement │ ─ 401
│ quantity related to a channel condition, whether to │
│       decode a power-saving signal          │
└─────────────────────────────────────────────┘
```

FIG. 4

```
┌─────────────────────────────────────────────┐
│   Send a threshold for the measurement quantity │ ─ 501
│  related to a channel condition to a terminal device │
└─────────────────────────────────────────────┘
```

FIG. 5

```
┌─────────────────────────────────────────────┐
│ Determine a time-domain resource for a target signal │ ─ 601
│           according to a target time interval         │
└─────────────────────────────────────────────┘
```

FIG. 6

POWER-SAVING SIGNAL DETECTING METHOD, RESOURCE DETERMINING METHOD AND RELATED DEVICES

CROSS-REFERENCE TO RELATED APPLICATIONS

This application is a Bypass Continuation Application of PCT/CN2020/070911 filed on Jan. 8, 2020, which claims priority to Chinese Patent Application No. 201910108019.0 filed on Feb. 2, 2019, which are incorporated herein by reference in their entirety.

TECHNICAL FIELD

The present disclosure relates to the field of communications technologies, and in particular, to a power-saving signal detecting method, a resource determining method and related devices.

BACKGROUND

In order to reduce power consumption of user equipment (UE) (also known as a terminal device) blindly detecting a paging signal, blindly detecting a physical downlink control channel (PDCCH), or the like, a discontinuous reception (DRX) mechanism is proposed, where the foregoing DRX may include DRX in a radio resource control (RRC)-idle (that is, RRC_IDLE) state or in an RRC-inactive (that is, RRC_INACTIVE) state and DRX in an RRC-connected (that is, RRC_CONNECTED) state.

SUMMARY

The embodiments of the present disclosure provide a power-saving signal detecting method, a resource determining method and related devices.

According to a first aspect, an embodiment of the present disclosure provides a power-saving signal detecting method, where the method is applied to a terminal device and includes:
determining, according to a measured measurement quantity related to a channel condition, whether to detect a power-saving signal.

According to a second aspect, an embodiment of the present disclosure further provides a power-saving signal detecting method, where the method is applied to a network side device and includes:
sending a threshold for a measurement quantity related to a channel condition to a terminal device.

According to a third aspect, an embodiment of the present disclosure provides a resource determining method, where the method is applied to a terminal device and includes:
determining a time-domain resource for a target signal according to a target time interval;
where the target time interval includes at least one of a first time interval, a second time interval, or a third time interval; where the first time interval is a time interval between a power-saving signal and a PDCCH associated with the power-saving signal, the second time interval is a time interval between the power-saving signal and a first signal, and the third time interval is a time interval between the PDCCH associated with the power-saving signal and the first signal, the first signal is a signal used for downlink synchronization or radio resource management (RRM) measurement or beam management, and the target signal includes at least one of the power-saving signal or the first signal.

According to a fourth aspect, an embodiment of the present disclosure provides a resource determining method, where the method is applied to a network side device and includes:
sending a target time interval to a terminal device;
where the target time interval includes at least one of a first time interval, a second time interval, or a third time interval; where the first time interval is a time interval between a power-saving signal and a PDCCH associated with the power-saving signal, the second time interval is a time interval between the power-saving signal and a first signal, and the third time interval is a time between the PDCCH associated with the power-saving signal and the first signal, the first signal is a sequence signal used for downlink synchronization or radio resource management measurement or beam management.

According to a fifth aspect, an embodiment of the present disclosure further provides a terminal device. The terminal device includes:
a determining module, configured to determine, according to a measured measurement quantity related to a channel condition, whether to detect a power-saving signal.

According to a sixth aspect, an embodiment of the present disclosure further provides a network side device. The network side device includes:
a sending module, configured to send a threshold for a measurement quantity related to a channel condition to a terminal device.

According to a seventh aspect, an embodiment of the present disclosure further provides a terminal device. The terminal device includes:
a determining module, configured to determine a time-domain resource for a target signal according to a target time interval;
where the target time interval includes at least one of a first time interval, a second time interval, or a third time interval; where the first time interval is a time interval between a power-saving signal and a PDCCH associated with the power-saving signal, the second time interval is a time interval between the power-saving signal and a first signal, and the third time interval is a time interval between the PDCCH associated with the power-saving signal and the first signal, the first signal is a signal used for downlink synchronization or RRM measurement or beam management, and the target signal includes at least one of the power-saving signal or the first signal.

According to an eighth aspect, an embodiment of the present disclosure further provides a network side device. The network side device includes:
a sending module, configured to send a target time interval to a terminal device;
where the target time interval includes at least one of a first time interval, a second time interval, or a third time interval; where the first time interval is a time interval between a power-saving signal and a PDCCH associated with the power-saving signal, the second time interval is a time interval between the power-saving signal and a first signal, and the third time interval is a time between the PDCCH associated with the power-saving signal and the first signal, the first signal is a sequence signal used for downlink synchronization or RRM measurement or beam management.

According to a ninth aspect, an embodiment of the present disclosure further provides a terminal device, including a processor, a memory, and a computer program stored in the memory and executable on the processor, where when the computer program is executed by the processor, steps of the foregoing power-saving signal detecting method according to the first aspect are implemented.

According to a tenth aspect, an embodiment of the present disclosure further provides a network side device, including a processor, a memory, and a computer program stored in the memory and executable on the processor, where when the computer program is executed by the processor, steps of the foregoing power-saving signal detecting method according to the second aspect are implemented.

According to a eleventh aspect, an embodiment of the present disclosure further provides a terminal device, including a processor, a memory, and a computer program stored in the memory and executable on the processor, where when the computer program is executed by the processor, steps of the foregoing resource determining method according to the third aspect are implemented.

According to a twelfth aspect, an embodiment of the present disclosure further provides a network side device, including a processor, a memory, and a computer program stored in the memory and executable on the processor, where when the computer program is executed by the processor, steps of the foregoing resource determining method according to the fourth aspect are implemented.

According to a thirteenth aspect, an embodiment of the present disclosure further provides a non-transitory computer-readable storage medium, where the non-transitory computer-readable storage medium stores a computer program, and when the computer program is executed by a processor, steps of the power-saving signal detecting method according to the foregoing first aspect are implemented, or steps of the power-saving signal detecting method according to the foregoing second aspect are implemented, or steps of the resource determining method according to the foregoing third aspect are implemented, or steps of the resource determining method according to the foregoing fourth aspect are implemented.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings.

FIG. 3 is a structural diagram of a network system to which embodiments of the present disclosure can be applied;

FIG. 4 is a flowchart of a power-saving signal detecting method according to an embodiment of the present disclosure;

FIG. 5 is a flowchart of a power-saving signal detecting method according to yet another embodiment of the present disclosure;

FIG. 6 is a flowchart of a resource determining method according to an embodiment of the present disclosure;

DETAILED DESCRIPTION OF EMBODIMENTS

Figure 1:
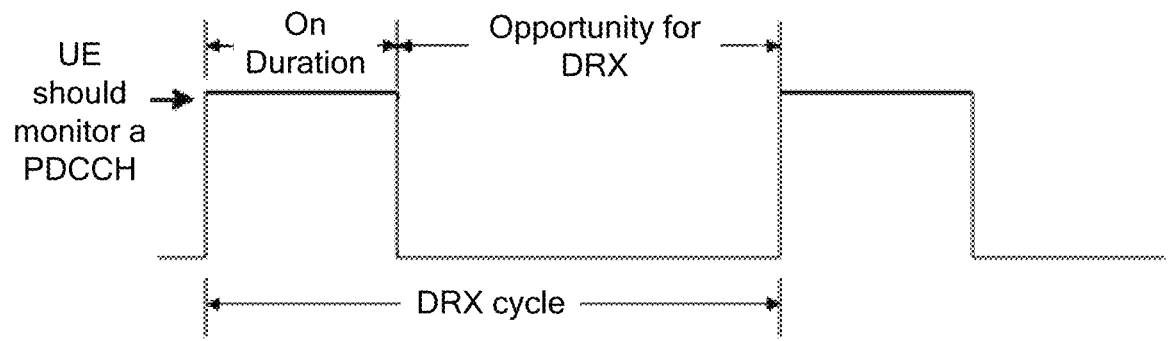
FIG. 1 is a schematic diagram of a DRX cycle according to an embodiment of the present disclosure.

The following clearly describes the technical solutions in the embodiments of the present disclosure with reference to the accompanying drawings in the embodiments of the present disclosure. Apparently, the described embodiments are some rather than all of the embodiments of the present disclosure.

In the specification and claims of this application, the terms such as "first" and "second" are used for distinguishing similar objects, and are not necessarily used to describe a particular order or sequence. It should be understood that data used in this way may be interchangeable in appropriate cases, so that the embodiments of this application described herein are implemented in a sequence other than those shown or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device. In addition, in the specification and claims, "and/or" is used to indicate at least one of connected objects, for example, A and/or B and/or C indicates seven cases: only A, only B, only C, both A and B, both B and C, both A and C, and A, B and C.

The power-saving signal can reduce power consumption of detecting a paging signal or blindly detecting a PDCCH. In actual application, if a power-saving signal instructs UE to detect a PDCCH at the time of a paging occasion (PO) or a PDCCH during onduration (that is, OnDuration) in a DRX cycle, the UE detects the PDCCH; and if the power-saving signal skips instructing the UE to detect a PDCCH at the time of a PO or a PDCCH during OnDuration in a DRX cycle, the UE skips detecting the PDCCH.

However, there is no relevant solution for how to apply power-saving signals (for example, how to detect a power-saving signal, how to determine a related resource for detecting a power-saving signal, or the like).

For ease of description, the following describes some content in the embodiments of the present disclosure:

In a mobile communications system, for example, new radio (NR) supports a power-saving parameter related to a UE (also referred to as a terminal device), such as a size of a bandwidth part (BWP), a number of multiple-input multiple-output (MIMO) layers, and a number of downlink component carriers activated at the same time. Different values of the foregoing power-saving parameter may lead to different power consumption of a terminal device.

1. Discontinuous reception (DRX) in a radio resource control (RRC) idle (that is, RRC_IDLE) state or in an RRC inactive (that is, RRC_INACTIVE) state:

In a Long Term Evolution (LTE) or a fifth generation (5G) communications system, a UE in an RRC-IDLE state needs to detect a paging signal sent by a base station at a pre-configured time, where a process of detecting the paging signal may be as follows:

blindly detecting a the physical downlink control channel (PDCCH) corresponding to a paging radio network temporary identifier (P-RNTI); if no PDCCH is detected, ending the detecting; if a PDCCH is detected, further detecting a physical downlink shared channel (PDSCH) indicated by the PDCCH; if the detected PDSCH is not a paging signal of the UE, ending the detecting; otherwise, the detected PDSCH is a paging signal of the user.

UE in an RRC_IDLE state periodically detects a paging signal, and the probability of receiving a paging signal belonging to the UE is relatively low. As power consumption of detecting a PDCCH and a PDSCH each time is great, it is not conducive to power-saving for a terminal.

2. DRX in a RRC connected (that is, RRC_CONNECTED) state:

A basic mechanism of DRX is to configure one DRX cycle (that is, DRX Cycle) for UE in a RRC_CONNECTED state. A DRX cycle consists of an on duration (that is, OnDuration) and an opportunity for DRX (that is, Opportunity for DRX), where during the on duration, UE monitors and receives a PDCCH (that is, an active period); during the opportunity for DRX, UE skips receiving data of any downlink channel to reduce power consumption (that is, sleep period).

For example, referring to FIG. 1, in a time domain, time is divided into consecutive DRX cycles. A DRX start offset (that is, drxStartOffset) specifies a start subframe of a DRX cycle, and a long DRX-Cycle (that is, longDRX-Cycle) specifies how many subframes a long DRX cycle (that is, long DRX Cycle) occupies. These two parameters are determined by a long DRX cycle start offset (that is, longDRX-CycleStartOffset) field. An on duration timer (that is, OnDurationTimer) specifies a number of a PDCCH's consecutive subframes (that is, a number of subframes during which an active period lasts) that need to be monitored starting from a start subframe of a DRX cycle.

In most cases, when one piece of UE is scheduled in a certain subframe and receives or transmits data, the UE is very likely to be scheduled continuously in the next few subframes. An additional delay may arise if these data are not received or sent until a next DRX cycle. In order to reduce such a delay, the UE will be in an active period continuously after being scheduled, that is, it will monitor a PDCCH continuously during a configured active period. An implementation mechanism is as follows: every time when UE is scheduled for a new transmission, a DRX inactivity timer (that is, drx-InactivityTimer) will be started (or restarted), and the UE will remain in an active state until the DRX inactivity timer expires. The DRX inactivity timer indicates a number of consecutive subframes that are continuously in an active state after the UE successfully decodes new uplink (UL) or downlink (DL) data scheduled by one PDCCH. That is, the DRX inactivity timer is restarted every time when transmitted new data is scheduled for the UE.

In order to further reduce power consumption of a blindly detection for paging signal or a PDCCH under the foregoing two DRXs, a wake-up signal (WUS) and a sleep signal are proposed, where the foregoing wake-up signal and sleep signal may be collectively referred to as power-saving signals (that is, Power Saving Signal).

3. Power-saving signal in an RRC_IDLE or RRC_INACTIVE state:

In each paging cycle in the idle state, a base station may transmit one power-saving signal to UE before a paging occasion (PO), and the UE detects the power-saving signal at the corresponding time.

If the power-saving signal instructs the UE to detect a PDCCH at the PO time, the UE detects the PDCCH; if the power-saving signal skips instructing the UE to detect a PDCCH at the PO time, the UE skips detecting the PDCCH.

It should be noted that detecting a wake-up signal is less complicated and more power-saving than blindly detecting a paging signal or a PDCCH.

Figure 2:
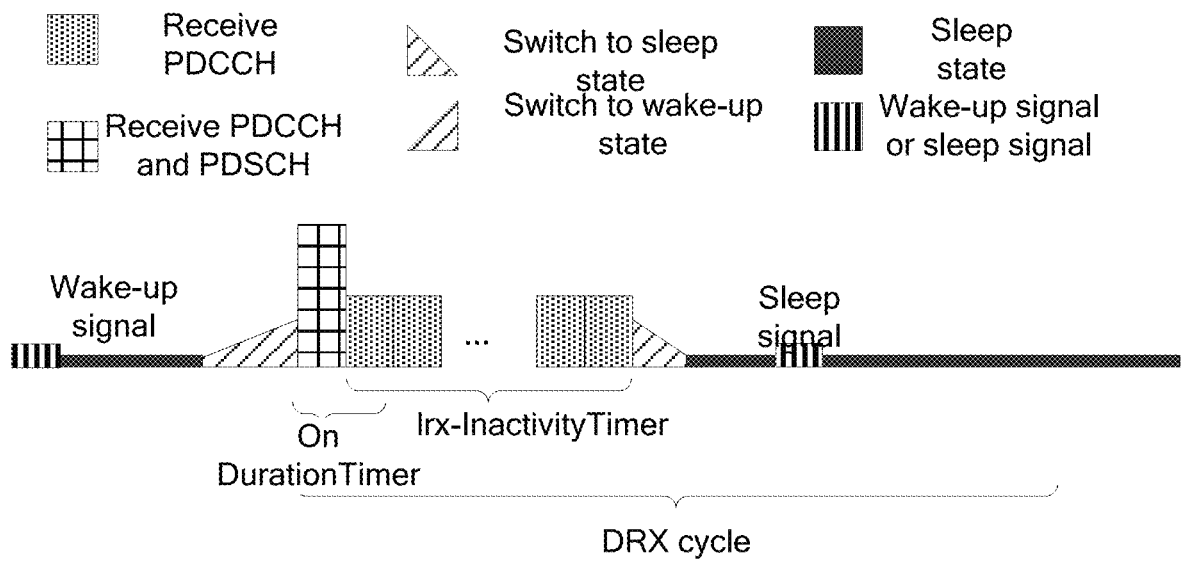
FIG. 2 is a schematic diagram of a wake-up signal time flow before connected DRX (CDRX) OnDuration according to an embodiment of the present disclosure.

4. Power-saving signal in an RRC_connected state:

As shown in FIG. 2, in each CDRX cycle in the RRC-connected state, a base station transmits one power-saving signal to UE before OnDuration or at the beginning of OnDuration, and the UE detects the power-saving signal at the corresponding time.

If the power-saving signal instructs the UE to detect the PDCCH of OnDuration, the UE detects the PDCCH; if the power-saving signal skips instructing the UE to detect the PDCCH of OnDuration, the UE skips detecting the PDCCH.

It should be noted that detecting a wake-up signal is less complicated and more power-saving than blindly detecting a paging signal or a PDCCH.

It should be noted that the foregoing power-saving signal may be a signal transmitted on a PDCCH, or a sequence-based signal, such as a channel state information reference signal (CSI-RS), or an on-off keying (OOK) signal.

Referring to FIG. 3, FIG. 3 is a structural diagram of a network system applicable to the embodiments of the present disclosure. As shown in FIG. 3, the network system includes a terminal device 11 and a network side device 12. The terminal device 11 may be a user side device such as a mobile phone, a tablet personal computer, a laptop computer, a personal digital assistant (PDA), a mobile Internet device (MID), or a wearable device. It should be noted that a specific type of the terminal device 11 is not limited in the embodiments of the present disclosure. The network side device 12 may be a base station, for example, a macro base station, an LTE evolved NodeB (eNB), a 5G NR NodeB (NB), or a next generation Node B (gNB). The network side device 12 may be alternatively a small cell, for example, a low power node (LPN), a picocell base station (pico) or a femto base station (femto), or the network side device 12 may be an access point (AP). The base station may be alternatively a network node formed by a central unit (CU) and a plurality of transmission reception points (TRP) that are managed and controlled by the CU. It should be noted that a specific type of the network side device 12 is not limited in this embodiment of the present disclosure.

In an embodiment, the terminal device 11 may determine whether to detect a power-saving signal according to a measured measurement quantity related to a channel condition, where the foregoing measured measurement quantity related to a channel condition may include, but are not limited to, at least one of a reference signal received power (RSRP), an measurement quantity related to a change of RSRP, reference signal received quality (RSRQ), an measurement quantity related to a change of RSRQ, a signal to interference plus noise ratio (SINR), an measurement quantity related to a change of SINR, or a mobility parameter.

It should be noted that the foregoing measurement quantity related to a change of RSRP, measurement quantity related to a change of RSRQ, and measurement quantity related to a change of SINR may all be set properly according to an actual need.

For example, the foregoing measurement quantity related to a change of RSRP may be a variance or a standard deviation of RSRP obtained by means of multiple measurements, for example, a variance or a standard deviation of all RSRP measured during a period of time; a difference between or a ratio of a value of RSRP measured currently to a value of RSRP measured previously, or the like. Similarly, the foregoing measurement quantity related to a change of RSRQ may be a variance or a standard deviation of RSRQ obtained by means of multiple measurements, for example, a variance or a standard deviation of all RSRQ measured during a period of time; a difference between or a ratio of a value of RSRQ measured currently to a value of RSRQ measured previously, or the like. The foregoing measurement quantity related to a change of SINR may be a variance or a standard deviation of SINRs obtained by means of multiple measurements, for example, a variance or a standard deviation of all SINRs measured during a period of time; a difference between or a ratio of a value of SINR measured currently to a value of SINR measured previously, or the like.

The foregoing measurement quantity related to mobility may be an indicator used to measure mobility of the terminal device 11, for example, it may be a number of cells on which the terminal device 11 camps within a first preset time, a number of beams on which the terminal device camps within a second preset time, a movement velocity of the terminal device 11, a Doppler frequency shift of the terminal device, or a number of transmission configuration indicator (TCI) states of the terminal device 11 within a third preset time. Among them, the foregoing first preset time, second preset time, and third preset time may all be set properly according to an actual need, which is not limited in this embodiment.

The foregoing power-saving signal may be a signal transmitted on a PDCCH; it may also be a sequence-based signal, where the sequence-based signal may be a CSI-RS, a primary synchronization signal (PSS), and a secondary synchronization signal (SSS), a tracking reference signal (TRS) or a demodulation reference signal (DMRS), or the like.

Optionally, the terminal device 11 may detect the power-saving signal in the case that the measured measurement quantity related to a channel condition satisfies a threshold requirement; skip requiring detecting the power-saving signal in the case that the measured measurement quantity related to a channel condition fails to satisfy a threshold, and at this time, a PDCCH associated with the power-saving signal may be detected.

It should be noted that the foregoing skipping requiring detecting the power-saving signal may mean that the terminal device may detect the power-saving signal, or may not detect the power-saving signal. The foregoing PDCCH associated with the power-saving signal may include a PDCCH carrying paging information, or a PDCCH located at OnDuration in a DRX cycle. For example, for an RRC_IDLE state or RRC_INACTIVE state, the foregoing PDCCH associated with the power-saving signal may be a PDCCH carrying paging information, and for an RRC_CONNECTED state, the foregoing PDCCH associated with the power-saving signal may be a PDCCH located at OnDuration in a DRX cycle.

Optionally, the foregoing threshold corresponds to the measurement quantity related to a channel condition. For example, if the foregoing measurement quantity related to a channel condition includes RSRP, the foregoing threshold may include a threshold for the RSRP; if the foregoing measurement quantity related to a channel condition includes RSRQ, the foregoing threshold may include a threshold for the RSRQ; if the foregoing measurement quantity related to a channel condition includes RSRP and RSRQ, the foregoing threshold may include a threshold for the RSRP and a threshold for the RSRQ. It should be noted that the foregoing threshold may be predefined in a protocol or configured by the network side device 12.

In another embodiment, the terminal device 11 may determine a time-domain resource for a target signal according to a target time interval, where the target time interval may include at least one of a first time interval, a second time interval or a third time interval.

Among them, the foregoing first time interval may be a time interval between a power-saving signal and a PDCCH associated with the power-saving signal, and the foregoing second time interval may be a time interval between the power-saving signal and a first signal, and the foregoing third time interval may be a time interval between the PDCCH associated with the power-saving signal and the first signal.

The foregoing first signal may be a signal used for downlink synchronization or radio resource management (RRM) measurement or beam management. In an actual application, before detecting the power-saving signal, the terminal device 11 may perform synchronization or RRM measurement or beam management according to a CSI-RS, a TRS, or the like, so as to receive the power-saving signal.

The foregoing target signal includes at least one of the power-saving signal or the first signal.

The foregoing target time interval may be predefined in a protocol, or may be configured by the network side device 12.

Optionally, the terminal device 11 may determine a time-domain resource for a target signal according to a target time interval before detecting a power-saving signal.

Optionally, in the case that the target time interval is configured by the network side device 12, the terminal device 11 may first report capability information of the terminal device to the network side device 12, where the capability information includes at least one of a fourth time interval, a fifth time interval or a sixth time interval.

Among them, the foregoing fourth time interval may be a time interval between the power-saving signal and the PDCCH associated with the power-saving signal, the foregoing fifth time interval may be a time interval between the power-saving signal and the first signal, and the foregoing sixth time interval may be a time interval between the PDCCH associated with the power-saving signal and the first signal.

After receiving the capability information of the terminal device reported by the terminal device 11, the network side device 12 may configure the foregoing target time interval based on the capability information of the terminal device.

The embodiment of the present disclosure standardize a way of detecting a power-saving signal or a way of configuring a power-saving signal resource, which can not only reduce power consumption of a terminal device, but also improve the communication reliability.

An embodiment of the present disclosure provides a power-saving signal detecting method, which is applied to a terminal device. Referring to FIG. 4, FIG. 4 is a flowchart of a power-saving signal detecting method according to an embodiment of the present disclosure. As shown in FIG. 4, the method includes the following steps:

Step 401: Determine, according to a measured measurement quantity related to a channel condition, whether to detect a power-saving signal.

In this embodiment, the foregoing power-saving signal may be a signal transmitted on a PDCCH, or a sequence-based signal, where the foregoing sequence-based signal may be a CSI-RS, a PSS, an SSS, a TRS, a DMRS, or the like. The foregoing measurement quantity related to a channel condition may be set properly according to an actual need.

Optionally, the foregoing measurement quantity related to a channel condition may include but are not limited to at least one of:

reference signal received power RSRP, measurement related to a change of RSRP, reference signal reception quality RSRQ, measurement related to a change of RSRQ, signal to interference plus noise ratio SINR, measurement related to a change of SINR, or mobility related measurement.

It should be noted that the foregoing measurement quantity related to a change of RSRP, measurement quantity related to a change of RSRQ, and measurement quantity related to a change of SINR may all be set properly according to an actual need.

For example, the foregoing measurement quantity related to a change of RSRP may be a variance or a standard deviation of RSRP obtained by means of multiple measurements, for example, a variance or a standard deviation of all RSRP measured during a period of time; a difference between or a ratio of a value of RSRP measured currently to a value of RSRP measured previously, or the like. Similarly, the foregoing measurement related to a change of RSRQ may be a variance or a standard deviation of RSRQ obtained by means of multiple measurements, for example, a variance or a standard deviation of all RSRQ measured during a period of time; a difference between or a ratio of a value of RSRQ measured currently to a value of RSRP measured previously, or the like. The foregoing measurement quantity related to a change of SINR may be a variance or a standard deviation of SINRs obtained by means of multiple measurements, for example, a variance or a standard deviation of all SINRs measured during a period of time; a difference between or a ratio of a value of SINR measured currently to a value of SINR measured previously, or the like.

The foregoing measurement quantity related to mobility may be an indicator used to measure mobility of the terminal device.

Optionally, the measurement quantity related to mobility may include, but is not limited to, at least one of:

a number of cells on which the terminal device camps during a first preset time;
a number of beams on which the terminal device camps during a second preset time;
a movement velocity of the terminal device;
a Doppler frequency shift of the terminal device; or
a number of TCI states of the terminal device during a third preset time.

In this embodiment, the foregoing first preset time, second preset time, and third preset time may all be set properly according to an actual need, which is not limited in this embodiment.

In an actual application, the power-saving signal may be detected in the case that an indicator signal condition of the measured measurement quantity related to a channel condition is good, so as to reduce power consumption of the terminal device, and it is not required to detect the power-saving signal in the case that an indicator signal condition of the measured measurement quantity related to a channel condition is poor, so as to improve the communication reliability.

The power-saving signal detecting method provided in this embodiment of the present disclosure determines, according to a measured measurement quantity related to a channel condition, whether to detect a power-saving signal, and standardizes a way of detecting a power-saving signal, which can not only reduce power consumption of a terminal device, but also improve the communication reliability.

Optionally, the determining, according to a measured measurement quantity related to a channel condition, whether to detect a power-saving signal may include at least one of:

detecting the power-saving signal in the case that the measured measurement quantity related to a channel condition satisfies a threshold requirement;
skipping requiring detecting the power-saving signal in the case that the measured measurement quantity related to a channel condition fails to satisfy a threshold; or detecting a first physical downlink control channel PDCCH in the case that the measured measurement quantity related to a channel condition fails to satisfy a threshold, where the first PDCCH is a PDCCH associated with the power-saving signal.

In this embodiment, the foregoing threshold corresponds to the measurement quantity related to a channel condition. For example, if the foregoing measurement quantity related to a channel condition includes RSRP, the foregoing threshold may include a threshold for the RSRP; if the foregoing measurement quantity related to a channel condition includes RSRQ, the foregoing threshold may include a threshold for the RSRQ; if the foregoing measurement quantity related to a channel condition includes RSRP and RSRQ, the foregoing threshold may include a threshold for the RSRP and a threshold for the RSRQ.

For example, the foregoing threshold may be predefined in a protocol or configured by a network side device.

In an actual application, in the case that the measured measurement quantity related to a channel condition satisfies a threshold requirement, it indicates that the channel condition is good. At this time, the power-saving signal may be detected to reduce power consumption of the terminal device. For example, in the case that the measured RSRP is larger than or equal to a first threshold, the power-saving signal may be detected; in the case that the measured measurement quantity related to a channel condition fails to satisfy a threshold, it indicates that the channel condition is not good. At this time, it is possible not to require detecting the power-saving signal, but a PDCCH associated with the power-saving signal may be detected, so as to improve the communication stability. For example, in the case that the measured RSRP is less than a first threshold, it is possible not to require detecting the power-saving signal, but a PDCCH associated with the power-saving signal may be detected.

It should be noted that the foregoing skipping requiring detecting the power-saving signal may mean that the terminal device may detect the power-saving signal, or may not detect the power-saving signal. The foregoing PDCCH associated with the power-saving signal may include a PDCCH carrying paging information, or a PDCCH located at OnDuration in a DRX cycle. For example, for an RRC_IDLE state or RRC_INACTIVE state, the foregoing PDCCH associated with the power-saving signal may be a PDCCH carrying paging information, and for an RRC_CONNECTED state, the foregoing PDCCH associated with the power-saving signal may be a PDCCH located at OnDuration in a DRX cycle.

Optionally, that the measured measurement quantity related to a channel condition satisfies a threshold requirement may include at least one of:
  measured RSRP is larger than or equal to a first threshold;
  measured RSRQ is larger than or equal to a second threshold;
  a measured measurement quantity related to mobility satisfies a third threshold requirement;
  a measured measurement quantity related to a change of RSRP satisfies a fourth threshold requirement;
  a measured measurement quantity related to a change of RSRQ satisfies a fifth threshold requirement;
  a measured SINR is larger than or equal to a sixth threshold; or
  a measured measurement quantity related to a change of SINR satisfies a seventh threshold requirement.

In this embodiment, the foregoing first threshold, second threshold, third threshold, fourth threshold, fifth threshold, sixth threshold, and seventh threshold may all be predefined in a protocol or configured on a network side, which is not limited in this embodiment.

Optionally, that the foregoing measured measurement quantity related to mobility satisfies a third threshold requirement may include, but is not limited to: a number of cells on which the terminal device camps during a first preset time is less than or equal to the third threshold; or a number of beams on which the terminal device camps during a second preset time is less than or equal to the third threshold; or a movement velocity of the terminal device is less than or equal to the third threshold; or a Doppler frequency shift of the terminal device is less than or equal to the third threshold; or a number of TCI states of the terminal device during a third preset time is less than or equal to the third threshold, or the like.

That the foregoing measured measurement quantity related to a change of RSRP satisfies a fourth threshold requirement may include, but is not limited to, that a variance of the measured RSRP is less than or equal to the fourth threshold.

That the foregoing measured measurement quantity related to a change of RSRQ satisfies a fifth threshold requirement may include, but is not limited to, that a variance of the measured RSRQ is less than or equal to the fifth threshold.

That the foregoing measured measurement quantity related to a change of SINR satisfies a seventh threshold requirement may include, but is not limited to, that a variance of the measured SINR is less than or equal to the seventh threshold.

An embodiment of the present disclosure provides a power-saving signal detecting method, which is applied to a network side device. Referring to FIG. 5, FIG. 5 is a flowchart of a power-saving signal detecting method according to an embodiment of the present disclosure. As shown in FIG. 5, the method includes the following steps:

Step 501: Send a threshold for the measurement quantity related to a channel condition to a terminal device.

In this embodiment, the foregoing threshold corresponds to the measurement quantity related to a channel condition. For example, if the foregoing measurement quantity related to a channel condition includes RSRP, the foregoing threshold may include a threshold for the RSRP; if the foregoing measurement quantity related to a channel condition includes RSRQ, the foregoing threshold may include a threshold for the RSRQ; if the foregoing measurement quantity related to a channel condition includes RSRP and RSRQ, the foregoing threshold may include a threshold for the RSRP and a threshold for the RSRQ.

In the power-saving signal detecting method provided in this embodiment of the present disclosure, the threshold for a measurement quantity related to a channel condition is sent to the terminal device, so that the terminal device may determine whether to detect a power-saving signal based on the threshold for a measurement quantity related to a channel condition.

Optionally, the measurement quantity related to a channel condition may include, but is not limited to, at least one of reference signal received power (RSRP), an measurement quantity related to a change of RSRP, reference signal received quality (RSRQ), an measurement quantity related to a change of RSRQ, a signal-to-interference plus noise ratio (SINR), a measurement quantity related to a change of SINR, or a measurement quantity related to mobility.

It should be noted that the foregoing measurement quantity related to a change of RSRP, measurement quantity related to a change of RSRQ, and measurement quantity related to a change of SINR may all be set properly according to an actual need.

For example, the foregoing measurement quantity related to a change of RSRP may be a variance or a standard deviation of RSRP obtained by means of multiple measurements, for example, a variance or a standard deviation of all RSRP measured during a period of time; a difference between or a ratio of a value of RSRP measured currently to a value of RSRP measured previously, or the like. Similarly, the foregoing measurement related to a change of RSRQ may be a variance or a standard deviation of RSRQ obtained by means of multiple measurements, for example, a variance or a standard deviation of all RSRQ measured during a period of time; a difference between or a ratio of a value of RSRQ measured currently to a value of RSRP measured previously, or the like. The foregoing measurement quantity related to a change of SINR may be a variance or a standard deviation of SINRs obtained by means of multiple measurements, for example, a variance or a standard deviation of all SINRs measured during a period of time; a difference between or a ratio of a value of SINR measured currently to a value of SINR measured previously, or the like.

The foregoing measurement quantity related to mobility may be an indicator used to measure mobility of the terminal device.

Optionally, the measurement quantity related to mobility may include, but is not limited to, at least one of:
  a number of cells on which the terminal device camps during a first preset time;
  a number of beams on which the terminal device camps during a second preset time;
  a movement velocity of the terminal device;

a Doppler frequency shift of the terminal device; or a number of transmission configuration indicator (TCI) states of the terminal device during a third preset time.

In this embodiment, the foregoing first preset time, second preset time, and third preset time may all be set properly according to an actual need, which is not limited in this embodiment.

The following describes the power-saving signal detecting method according to this embodiment of the present disclosure by using specific examples:

The UE may determine whether to detect a power-saving signal according to a measurement quantity related to a channel condition obtained from the most recent one or more measurements, for example, at least one of RSRP of a serving cell, RSRQ of a serving cell, or a measurement quantity related to mobility. Some examples are shown as follows.

Example 1

If a measured layer 1 (that is, L1) or layer 3 (that is, L3) RSRP satisfies a first threshold requirement, the power-saving signal is detected;

otherwise (that is, the measured L1 or L3 RSRP fails to satisfy the first threshold), it is not required to detect the power-saving signal; at this time, the UE may detect a PDCCH.

For example, as shown in Table 1, the power-saving signal may be detected in the case that RSRP from the last measurement or multiple historical measurements is larger than or equal to a first threshold X (for example, X=−80 dB), otherwise, it is not required to detect the power-saving signal.

TABLE 1

| RSRP from the last measurement or multiple historical measurements (dB) | UE behavior |
| --- | --- |
| RSRP >= X | detect power-saving signal |
| RSRP < X | Skip requiring detecting the power-saving signal |

It should be noted that the foregoing skipping requiring detecting the power-saving signal may mean that the UE may detect the power-saving signal, or not detect the power-saving signal. The foregoing PDCCH may be a paging PDCCH for an RRC_IDLE state or RRC_INACTIVE state, and may be a PDCCH at OnDuration in a DRX cycle for an RRC_CONNECTED state. The same applies below and will not be repeated.

The foregoing first threshold may be predefined in a protocol or configured on a network side, which is not limited in this embodiment.

Example 2

If measured RSRQ satisfies a second threshold requirement, the power-saving signal is detected;

otherwise (that is, the measured RSRQ fails to satisfy the threshold), it is not required to detect the power-saving signal; at this time, the UE may detect a PDCCH.

For example, as shown in Table 2, the power-saving signal may be detected in the case that RSRQ from the last measurement or multiple historical measurements is larger than or equal to a second threshold Y (for example, Y=−6 dB), otherwise is not required to detect the power-saving signal.

TABLE 2

| RSRQ from the last measurement or multiple historical measurements (dB) | UE behavior |
| --- | --- |
| RSRQ >= Y | detect power-saving signal |
| RSRQ < Y | Skip requiring detecting the power-saving signal |

It should be noted that the foregoing second threshold may be predefined in a protocol or configured on a network side, which is not limited in this embodiment.

Example 3

If a measured mobility related measurement quantity satisfies a third threshold requirement, the power-saving signal is detected;

otherwise (that is, the measured measurement quantity related to mobility fails to satisfy the third threshold), it is not required to detect the power-saving signal; at this time, the UE may detect a PDCCH.

For example, as shown in Table 3, the power-saving signal may be detected in the case that a measurement quantity related to mobility M from the last measurement or multiple historical measurements satisfies a third threshold Z, it is not required to detect the power-saving signal.

TABLE 3

| measurement quantity related to mobility M | UE behavior |
| --- | --- |
| M satisfies Z | detect power-saving signal |
| M fails to satisfy Z | Skip requiring detecting the power-saving signal |

It should be noted that the foregoing third threshold may be predefined in a protocol or configured on a network side, which is not limited in this embodiment.

Among them, the foregoing measurement quantity related to mobility may include one of the following:

a number of cells on which the UE camps during a period of time;

a number of beams on which the UE camps during a period of time;

an estimated movement velocity of the UE;

an estimated Doppler frequency shift; and a number of TCI states of the UE during a period of time.

For example, if a number of cells on which the UE camps during a period of time is less than a third threshold, the power-saving signal is detected; otherwise, it is not required to detect the power-saving signal. Alternatively, if a number of changes in cells on which the UE camps during a period of time is less than a third threshold, the power-saving signal is detected; otherwise, it is not required to detect the power-saving signal.

Example 4

If a measured L1 or L3 RSRP satisfies a first threshold requirement and a measured L1 or L3 RSRQ satisfies a second threshold requirement, the power-saving signal is detected;

otherwise (that is, the RSRP and RSRQ fail to satisfy the thresholds at the same time), it is not required to detect the power-saving signal; at this time, the UE may detect a PDCCH.

For example, as shown in Table 4, the power-saving signal may be detected in the case that RSRP from the last measurement or multiple historical measurements is larger than or equal to a first threshold X and RSRQ is larger than or equal to a second threshold Y, otherwise, it is not required to detect the power-saving signal.

TABLE 4

| RSRP and RSRQ from the last measurement or multiple historical measurements (dB) | UE behavior |
|---|---|
| RSRP >= X and RSRQ >= Y | detect power-saving signal |
| Other scenarios | Skip requiring detecting the power-saving signal |

Example 5

If a measured L1 or L3 RSRP satisfies a first threshold requirement and a measurement quantity related to mobility satisfies a third threshold requirement, the power-saving signal is detected;
   otherwise (that is, the RSRP and measurement quantity related to mobility fail to satisfy the thresholds at the same time), it is not required to detect the power-saving signal; at this time, the UE may detect a PDCCH.

For example, as shown in Table 5, the power-saving signal may be detected in the case that RSRP from the last measurement or multiple historical measurements is larger than or equal to a first threshold X and a measurement quantity related to mobility M satisfies a third threshold Z, otherwise, it is not required to detect the power-saving signal.

TABLE 5

| RSRP from the last measurement or multiple historical measurements (dB) and measurement quantity related to mobility M | UE behavior |
|---|---|
| RSRP >= X and M satisfies Z | detect power-saving signal |
| Other scenarios | Skip requiring detecting the power-saving signal |

Among them, the foregoing measurement quantity related to mobility may include one of the following:
   a number of cells on which the UE camps during a period of time;
   a number of beams on which the UE camps during a period of time;
   an estimated movement velocity of the UE;
   an estimated Doppler frequency shift; and
   a number of TCI states of the UE during a period of time.

For example, if measured RSRP is larger than or equal to a first threshold, and a number of cells on which the UE camps during a period of time is less than a third threshold, the power-saving signal is detected; otherwise, it is not required to detect the power-saving signal. Alternatively, if measured RSRP is larger than or equal to a first threshold, and a number of changes in cells on which the UE camps during a period of time is less than a third threshold, the power-saving signal is detected;
   otherwise, it is not required to detect the power-saving signal.

Example 6

If a measured measurement quantity related to a change of RSRP satisfies a fourth threshold requirement, or a measured measurement quantity related to a change of RSRQ satisfies a fifth threshold requirement, the power-saving signal is detected;
   otherwise (that is, a measurement quantity related to a change of the RSRP or a measurement quantity related to a change of the RSRQ fails to satisfy the threshold), it is not required to detect the power-saving signal; at this time, the UE may detect a PDCCH.

It should be noted that the foregoing measurement quantity related to a change of RSRP may be a variance or a standard deviation of RSRP from multiple historical measurements, a difference between or a ratio of RSRP measured currently to RSRP measured previously, or the like.

The foregoing measurement quantity related to a change of RSRQ may be a variance or a standard deviation of RSRQ from multiple historical measurements, a difference between or a ratio of RSRQ measured currently to RSRQ measured previously, or the like.

For example, as shown in Table 6, the power-saving signal may be detected in the case that a variance N of RSRP from multiple historical measurements is less than or equal to a fourth threshold P, otherwise, it is not required to detect the power-saving signal.

TABLE 6

| Variance N of RSRP from multiple historical measurements | UE behavior |
|---|---|
| N <= P | detect power-saving signal |
| N > P | Skip requiring detecting the power-saving signal |

It should be noted that both the foregoing fourth threshold and fifth threshold may be predefined in a protocol or configured on a network side, which is not limited in this embodiment.

The power-saving signal detecting method provided in this embodiment of the present disclosure standardizes a UE's related behaviors of detecting a power-saving signal, where the power-saving signal may be detected in the case that a channel condition is good, which can reduce power consumption of the terminal, it is not required to detect the power-saving signal in the case that a channel condition is poor, and instead, the PDCCH is directly detected, so as to ensure reliability.

An embodiment of the present disclosure further provides a resource determining method, which is applied to a terminal device. Referring to FIG. 6, FIG. 6 is a flowchart of a resource determining method according to an embodiment of the present disclosure. As shown in FIG. 6, the method includes the following steps:

Step 601: Determine a time-domain resource for a target signal according to a target time interval;
   where the target time interval includes at least one of a first time interval, a second time interval, or a third time interval; where the first time interval is a time interval between a power-saving signal and a PDCCH associated with the power-saving signal, the second time interval is a time interval between the power-saving signal and a first signal, and the third time interval is a time interval between the PDCCH associated with the power-saving signal and the first signal, the first signal is a signal used for downlink synchronization or radio resource management RRM measurement or beam management, and the target signal includes at least one of the power-saving signal or the first signal.

In this embodiment, the foregoing power-saving signal may be a signal transmitted on a PDCCH, or a sequence-based signal, where the foregoing sequence-based signal may be a CSI-RS, a PSS, an SSS, a TRS, a DMRS, or the like.

The foregoing PDCCH associated with the power-saving signal may include a PDCCH carrying paging information, a PDCCH located at OnDuration in a DRX cycle, or the like. For example, for an RRC_IDLE state or RRC_INACTIVE state, the foregoing PDCCH associated with the power-saving signal may be a PDCCH carrying paging information, and for an RRC_CONNECTED state, the foregoing PDCCH associated with the power-saving signal may be a PDCCH located at OnDuration in a DRX cycle.

The foregoing first signal may be a signal used for downlink synchronization, RRM measurement or beam management, such as a CSI-RS, a PSS, an SSS, a TRS, or a DMRS. In an actual application, before detecting the power-saving signal, the terminal device may perform synchronization or RRM measurement or beam management according to a CSI-RS, a TRS, or the like, so as to facilitate reception of the power-saving signal.

The foregoing target signal may include at least one of the power-saving signal or the first signal. In an actual application, the time-domain resource for the power-saving signal and/or the first signal may be determined before the power-saving signal is detected, so as to facilitate subsequent reception of the power-saving signal.

It should be noted that the foregoing first time interval, second time interval, and third time interval may all include one or at least two time intervals, which is not limited in this embodiment.

The resource determining method provided in this embodiment of the present disclosure determines a time-domain resource for a target signal according to a target time interval, and standardizes a way of determining a resource related to power-saving signal detecting, so as to facilitate subsequent reception of a power-saving signal.

Optionally, the target time interval may be predefined in a protocol, or may be configured by a network side device.

Optionally, before the determining a time-domain resource for a target signal according to a target time interval, the method may further include:
  sending capability information of the terminal device to a network side device;
  where the capability information includes at least one of a fourth time interval, a fifth time interval, or a sixth time interval; where the fourth time interval is a time interval between the power-saving signal and the PDCCH associated with the power-saving signal, the fifth time interval is a time interval between the power-saving signal and the first signal, and the sixth time interval is a time interval between the PDCCH associated with the power-saving signal and the first signal.

In this embodiment, the terminal device reports the capability information of the terminal device to the network side device, so that the network side device can configure a target time interval for the terminal device based on the foregoing capability information. That is, the target time interval may be configured by the network side device based on the capability information of the terminal device.

In an actual application, the foregoing fourth time interval, fifth time interval, and sixth time interval may correspond to the foregoing first time interval, second time interval, and third time interval respectively.

For example, in the case that the terminal device reports a fourth time interval to the network side device, the network side device may configure a first time interval for the terminal device based on the fourth time interval, where the first time interval may be larger than or equal to the fourth time interval; in the case that the terminal device reports a fifth time interval to the network side device, the network side device may configure a second time interval for the terminal device based on the fifth time interval, where the second time interval may be larger than or equal to the fifth time interval; in the case that the terminal device reports a sixth time interval to the network side device, the network side device may configure a third time interval for the terminal device based on the sixth time interval, where the third time interval may be larger than or equal to the sixth time interval.

It should be noted that the foregoing fourth time interval, fifth time interval, and sixth time interval may all include one or at least two time intervals, which is not limited in this embodiment.

In this embodiment, the capability information of the terminal device is reported to the network side device, which facilitates more accurate configuration of the target time interval for the terminal device by the network side device.

Optionally, the first time interval or the fourth time interval includes at least two different time intervals;
  where the two different time intervals correspond to a first scenario and a second scenario respectively, where the first scenario is that a bandwidth part (BWP) where the power-saving signal is located is different from a BWP where the PDCCH associated with the power-saving signal is located, and the second scenario is that a BWP where the power-saving signal is located is the same as a BWP where the PDCCH associated with the power-saving signal is located.

In this embodiment, that the BWP where the foregoing power-saving signal is located is different from the BWP where the PDCCH associated with the power-saving signal is located may include that at least one of a center frequency or a resource block (RB) of the BWP where the foregoing power-saving signal is located and the BWP where the PDCCH associated with the power-saving signal is located is different.

For example, if that the BWP where the foregoing power-saving signal is located is different from the BWP where the PDCCH associated with the power-saving signal is located is that a center frequency of the BWP where the foregoing power-saving signal is located is different from a center frequency of the BWP where the PDCCH associated with the power-saving signal is located, that the BWP where the power-saving signal is located is the same as the BWP where the PDCCH associated with the power-saving signal may be that a center frequency of the BWP where the foregoing power-saving signal is located may be the same as a center frequency of the BWP where the PDCCH associated with the power-saving signal is located.

If that the BWP where the foregoing power-saving signal is located is different from the BWP where the PDCCH associated with the power-saving signal is located is that an RB of the BWP where the foregoing power-saving signal is located is different from an RB of the BWP where the PDCCH associated with the power-saving signal is located, that the BWP where the power-saving signal is located is the same as the BWP where the PDCCH associated with the power-saving signal is located may be that an RB of the BWP where the foregoing power-saving signal is located is the same as an RB of the BWP where the PDCCH associated with the power-saving signal is located.

If that the BWP where the foregoing power-saving signal is located is different from the BWP where the PDCCH associated with the power-saving signal is located is that a center frequency of the BWP where the foregoing power-saving signal is located is different from a center frequency of the BWP where the PDCCH associated with the power-saving signal is located, and an RB of the BWP where the foregoing power-saving signal is located is different from an RB of the BWP where the PDCCH associated with the power-saving signal is located, that the BWP where the power-saving signal is located is the same as the BWP where the PDCCH associated with the power-saving signal may be that at least one of the following is the same: a center frequency of the BWP where the foregoing power-saving signal is located and a center frequency of the BWP where the PDCCH associated with the power-saving signal is located, or an RB of the BWP where the foregoing power-saving signal is located and an RB of the BWP where the PDCCH associated with the power-saving signal is located.

Optionally, the second time interval or the fifth time interval includes at least two different time intervals;

where the two different time intervals correspond to a third scenario and a fourth scenario respectively, where the third scenario is that a BWP where the power-saving signal is located is different from a BWP where the first signal is located, and the fourth scenario is that a BWP where the power-saving signal is located is the same as a BWP where the first signal is located.

In this embodiment, that the BWP where the foregoing power-saving signal is located is different from the BWP where the first signal is located may include that at least one of a center frequency or an RB of the BWP where the foregoing power-saving signal is located and the BWP where the first signal is located is different.

For example, if that the BWP where the foregoing power-saving signal is located is different from the BWP where the first signal is located is that a center frequency of the BWP where the foregoing power-saving signal is located is different from a center frequency of the BWP where the first signal is located, that the BWP where the power-saving signal is located is the same as the BWP where the PDCCH associated with the power-saving signal is located may be that a center frequency of the BWP where the foregoing power-saving signal is located is the same as a center frequency of the BWP where the first signal is located.

If that the BWP where the foregoing power-saving signal is located is different from the BWP where the first signal is located is that an RB of the BWP where the foregoing power-saving signal is located is different from an RB of the BWP where the first signal is located, that the BWP where the power-saving signal is located is the same as the BWP where the PDCCH associated with the power-saving signal is located may be that an RB of the BWP where the foregoing power-saving signal is located is the same as an RB of the BWP where the first signal is located.

If that the BWP where the foregoing power-saving signal is located is different from the BWP where the first signal is located is that a center frequency of the BWP where the foregoing power-saving signal is located is different from a center frequency of the BWP where the first signal is located, and an RB of the BWP where the foregoing power-saving signal is located is different from an RB of the BWP where the first signal is located, that the BWP where the power-saving signal is located is the same as the BWP where the PDCCH associated with the power-saving signal is located may be that at least one of the following is the same: a center frequency of the BWP where the foregoing power-saving signal is located and a center frequency of the BWP where the first signal is located, or an RB of the BWP where the foregoing power-saving signal is located and an RB of the BWP where the first signal is located.

Optionally, the third time interval or the sixth time interval includes at least two different time intervals;

where the two different time intervals correspond to a fifth scenario and a sixth scenario respectively, where the fifth scenario is that a BWP where the PDCCH associated with the power-saving signal is located is different from a BWP where the first signal is located, and the sixth scenario is that a BWP where the PDCCH associated with the power-saving signal is located is the same as a BWP where the first signal is located.

In this embodiment, that the BWP where the first signal is located is different from the BWP where the PDCCH associated with the power-saving signal is located may include that at least one of a center frequency or an RB of the BWP where the foregoing first signal is located and the BWP where the PDCCH associated with the power-saving signal is located is different.

For example, if that the BWP where the foregoing first signal is located is different from the BWP where the PDCCH associated with the power-saving signal is located is that a center frequency of the BWP where the foregoing first signal is located is different from a center frequency of the BWP where the PDCCH associated with the power-saving signal is located, that the BWP where the first signal is located is the same as the BWP where the PDCCH associated with the power-saving signal may be that a center frequency of the BWP where the foregoing first signal is located may be the same as a center frequency of the BWP where the PDCCH associated with the power-saving signal is located.

If that the BWP where the foregoing first signal is located is different from the BWP where the PDCCH associated with the power-saving signal is located is that an RB of the BWP where the foregoing first signal is located is different from an RB of the BWP where the PDCCH associated with the power-saving signal is located, that the BWP where the first signal is located is the same as the BWP where the PDCCH associated with the power-saving signal is located may be that an RB of the BWP where the foregoing first signal is located is the same as an RB of the BWP where the PDCCH associated with the power-saving signal is located.

If that the BWP where the foregoing first signal is located is different from the BWP where the PDCCH associated with the power-saving signal is located is that a center frequency of the BWP where the foregoing first signal is located is different from a center frequency of the BWP where the PDCCH associated with the power-saving signal is located, and an RB of the BWP where the foregoing first signal is located is different from an RB of the BWP where the PDCCH associated with the power-saving signal is located, that the BWP where the first signal is located is the same as the BWP where the PDCCH associated with the power-saving signal may be that at least one of the following is the same: a center frequency of the BWP where the foregoing first signal is located and a center frequency of the BWP where the PDCCH associated with the power-saving signal is located, or an RB of the BWP where the foregoing first signal is located and an RB of the BWP where the PDCCH associated with the power-saving signal is located.

Optionally, the power-saving signal is a signal transmitted on a PDCCH or a sequence-based signal.

In this embodiment, in the case that the power-saving signal is transmitted on a PDCCH, downlink synchronization, RRM measurement or beam management may be performed according to a first signal (for example, a CSI-RS, a TRS, or the like) before the terminal device detects the power-saving signal transmitted based on a PDCCH.

In the case that the power-saving signal is a sequence-based signal, the foregoing power-saving signal and the first signal may be a same signal, for example, the power-saving signal may be received from a CSI-RS, a TRS, or the like at the same time when downlink synchronization, RRM measurement or beam management is performed according to a certain CSI-RS, a TRS, or the like; the foregoing power-saving signal and the first signal may be different signals, for example, downlink synchronization, RRM measurement or beam management is performed through a first CSI-RS, and the power-saving signal is transmitted by using a second CSI-RS.

Optionally, the power-saving signal and the first signal are different signals in the case that the power-saving signal is a sequence-based signal.

For example, the power-saving signal may be received from a CSI-RS, a TRS, or the like at the same time when downlink synchronization, RRM measurement or beam management is performed according to a certain CSI-RS, a TRS, or the like.

Optionally, the sequence-based signal may include but is not limited to one of the following: a channel state information reference signal CSI-RS, a primary synchronization signal PSS, a secondary synchronization signal SSS, a tracking reference signal TRS, and a demodulation reference signal DMRS.

Figure 7:
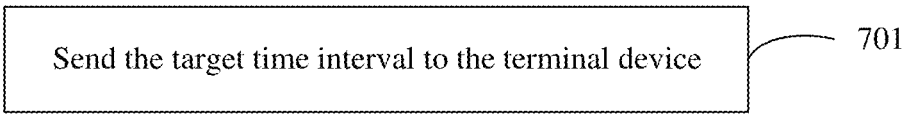
FIG. 7 is a flowchart of a resource determining method according to yet another embodiment of the present disclosure.

An embodiment of the present disclosure further provides a resource determining method, which is applied to a network side device. Referring to FIG. 7, FIG. 7 is a flowchart of a resource determining method according to an embodiment of the present disclosure. As shown in FIG. 7, the method includes the following steps:

Step 701: Send the target time interval to the terminal device;
  where the target time interval includes at least one of a first time interval, a second time interval, or a third time interval; where the first time interval is a time interval between a power-saving signal and a PDCCH associated with the power-saving signal, the second time interval is a time interval between the power-saving signal and a first signal, and the third time interval is a time between the PDCCH associated with the power-saving signal and the first signal, the first signal is a sequence signal used for downlink synchronization or radio resource management RRM measurement or beam management.

In this embodiment, the foregoing power-saving signal may be a signal transmitted on a PDCCH, or a sequence-based signal, where the foregoing sequence-based signal may be a CSI-RS, a PSS, an SSS, a TRS, a DMRS, or the like.

The foregoing PDCCH associated with the power-saving signal may include a PDCCH carrying paging information, a PDCCH located at OnDuration in a DRX cycle, or the like. For example, for an RRC_IDLE state or RRC_INACTIVE state, the foregoing PDCCH associated with the power-saving signal may be a PDCCH carrying paging information, and for an RRC_CONNECTED state, the foregoing PDCCH associated with the power-saving signal may be a PDCCH located at OnDuration in a DRX cycle.

The foregoing first signal may be a signal used for downlink synchronization, RRM measurement or beam management, such as a CSI-RS, a PSS, an SSS, a TRS, or a DMRS. In an actual application, before detecting the power-saving signal, the terminal device may perform synchronization or RRM measurement or beam management according to a CSI-RS, a TRS, or the like, so as to facilitate reception of the power-saving signal.

It should be noted that the foregoing first time interval, second time interval, and third time interval may all include one or at least two time intervals, which is not limited in this embodiment.

The resource determining method provided in this embodiment of the present disclosure sends a target time interval to a terminal device, so that the terminal device can determine at least one of a time-domain resource for a power-saving signal or a time-domain resource for a first signal based on the target time interval, so as to facilitate reception of the power-saving signal by the terminal device.

Optionally, the method may further include:
  receiving capability information of the terminal device from the terminal device;
  where the capability information includes at least one of a fourth time interval, a fifth time interval, or a sixth time interval; where the fourth time interval is a time interval between the power-saving signal and the PDCCH associated with the power-saving signal, the fifth time interval is a time interval between the power-saving signal and the first signal, and the sixth time interval is a time interval between the PDCCH associated with the power-saving signal and the first signal.

In this embodiment, by means of receiving the capability information of the terminal device, the target time interval can be configured for the terminal device based on the foregoing capability information, that is, the target time interval may be configured by the network side device based on the capability information of the terminal device.

In an actual application, the foregoing fourth time interval, fifth time interval, and sixth time interval may correspond to the foregoing first time interval, second time interval, and third time interval respectively.

For example, in the case that the terminal device reports a fourth time interval to the network side device, the network side device may configure a first time interval for the terminal device based on the fourth time interval, where the first time interval may be larger than or equal to the fourth time interval; in the case that the terminal device reports a fifth time interval to the network side device, the network side device may configure a second time interval for the terminal device based on the fifth time interval, where the second time interval may be larger than or equal to the fifth time interval; in the case that the terminal device reports a sixth time interval to the network side device, the network side device may configure a third time interval for the terminal device based on the sixth time interval, where the third time interval may be larger than or equal to the sixth time interval.

It should be noted that the foregoing fourth time interval, fifth time interval, and sixth time interval may all include one or at least two time intervals, which is not limited in this embodiment.

In this embodiment, by means of receiving the capability information of the terminal device, it is convenient for the network side device to configure a more accurate target time interval for the terminal device.

Optionally, the first time interval or the fourth time interval includes at least two different time intervals;
  where the two different time intervals correspond to a first scenario and a second scenario respectively, where the first scenario is that a bandwidth part BWP where the power-saving signal is located is different from a BWP where the PDCCH associated with the power-saving signal is located, and the second scenario is that a BWP where the power-saving signal is located is the same as a BWP where the PDCCH associated with the power-saving signal is located.

In this embodiment, that the BWP where the power-saving signal is located is different from the BWP where the PDCCH associated with the power-saving signal is located may include that at least one of a center frequency or an RB of the BWP where the foregoing power-saving signal is located and the BWP where the PDCCH associated with the power-saving signal is located is different.

Optionally, the second time interval or the fifth time interval includes at least two different time intervals;
where the two different time intervals correspond to a third scenario and a fourth scenario respectively, where the third scenario is that a BWP where the power-saving signal is located is different from a BWP where the first signal is located, and the fourth scenario is that a BWP where the power-saving signal is located is the same as a BWP where the first signal is located.

In this embodiment, that the BWP where the foregoing power-saving signal is located is different from the BWP where the first signal is located may include that at least one of a center frequency or an RB of the BWP where the foregoing power-saving signal is located and the BWP where the first signal is located is different.

Optionally, the third time interval or the sixth time interval includes at least two different time intervals;
where the two different time intervals correspond to a fifth scenario and a sixth scenario respectively, where the fifth scenario is that a BWP where the PDCCH associated with the power-saving signal is located is different from a BWP where the first signal is located, and the sixth scenario is that a BWP where the PDCCH associated with the power-saving signal is located is the same as a BWP where the first signal is located.

In this embodiment, that the BWP where the first signal is located is different from the BWP where the PDCCH associated with the power-saving signal is located may include that at least one of a center frequency or an RB of the BWP where the foregoing first signal is located and the BWP where the PDCCH associated with the power-saving signal is located is different.

Optionally, the power-saving signal is a signal transmitted on a PDCCH or a sequence-based signal.

Optionally, the power-saving signal and the first signal are different signals in the case that the power-saving signal is a sequence-based signal.

Optionally, the sequence-based signal may include but is not limited to one of the following: a channel state information reference signal CSI-RS, a primary synchronization signal PSS, a secondary synchronization signal SSS, a tracking reference signal TRS, and a demodulation reference signal DMRS.

The following describes the resource determining method according to this embodiment of the present disclosure by using examples:

In this embodiment, the power-saving signal may be a signal transmitted based on a PDCCH, or a sequence-based signal (for example, a CSI-RS, a TRS, or the like). In an actual application, before detecting the power-saving signal, the terminal device may perform synchronization or RRM measurement or beam management according to a CSI-RS, a TRS, or the like, so as to facilitate reception of the power-saving signal. For example, the following three scenarios may be included:

Scenario 1: in the case that the power-saving signal is transmitted based on a PDCCH, synchronization, RRM measurement or beam management may be performed according to a CSI-RS, a TRS, or the like before the UE detects the power-saving signal.

Scenario 2: in the case that the power-saving signal is a sequence-based signal (for example, a CSI-RS, a TRS, or the like), synchronization, RRM measurement or beam management may be performed according to a signal different from the power-saving signal (for example, a CSI-RS, a TRS, or the like) before the UE detects the power-saving signal.

Scenario 3: in the case that the power-saving signal is a sequence-based signal (for example, a CSI-RS, a TRS, or the like), synchronization, RRM measurement or beam management may further be performed according to a same signal as the power-saving signal (for example, a CSI-RS, a TRS, or the like) before the UE detects the power-saving signal.

Optionally, the resource determining method according to this embodiment of the present disclosure may include the following steps:

Step a1. UE may report a fourth time interval between a power-saving signal and a PDCCH associated with the power-saving signal to a base station, where the fourth time interval is used to indicate capability of the UE; or UE may report a fifth time interval between a power-saving signal and a CSI-RS used for downlink synchronization, RRM measurement or beam management to a base station, where the fifth time interval is used to indicate capability of the UE; or UE may report a sixth time interval between a PDCCH associated with a power-saving signal and a CSI-RS used for downlink synchronization, RRM measurement or beam management to a base station, where the sixth time interval is used to indicate capability of the UE.

Step a2. The base station may configure a first time interval between the power-saving signal and the PDCCH associated with the power-saving signal according to the capabilities reported by the UE, where the first interval is larger than or equal to a fourth time interval reported by the UE; or the base station may configure a second time interval between the power-saving signal and the CSI-RS used for downlink synchronization, RRM measurement or beam management according to the capabilities reported by the UE, where the second time interval is larger than or equal to a fifth time interval reported by the UE; or the base station may configure a second time interval between the PDCCH associated with the power-saving signal and the CSI-RS used for downlink synchronization, RRM measurement or beam management according to the capabilities reported by the UE, where the second time interval is larger than or equal to a fifth time interval reported by the UE.

Step a3. The UE determines a time-domain resource for the power-saving signal and a time-domain resource for the CSI-RS used for downlink synchronization, RRM measurement or beam management according to at least one of the first time interval, the second time interval, or the third time interval configured by the base station.

It should be noted that the fourth time interval between the power-saving signal and the PDCCH associated with the power-saving signal reported by the UE to the base station may include multiple types of time intervals. For example, if a center frequency of the BWP where the power-saving signal is located is different that of the BWP where the PDCCH associated with the power-saving signal is located, the UE reports a time interval A; and if their center frequencies are the same, the UE reports a time interval B.

The fifth time interval between the power-saving signal and the CSI-RS used for downlink synchronization, RRM measurement or beam management reported by the UE to the base station may also include multiple types of time intervals. For example, if a center frequency of the BWP where the power-saving signal is located is different that of the BWP where the CSI-RS used for downlink synchronization, RRM measurement or beam management is located, the UE reports a time interval C; and if their center frequencies are the same, the UE reports a time interval D.

The sixth time interval between the PDCCH associated with the power-saving signal and the CSI-RS used for downlink synchronization, RRM measurement or beam management reported by the UE to the base station may also include multiple types of time intervals. For example, if a center frequency of the BWP where the PDCCH associated with the power-saving signal is located is different that of the BWP where the CSI-RS used for downlink synchronization, RRM measurement or beam management is located, the UE reports a time interval E; and if their center frequencies are the same, the UE reports a time interval F.

Optionally, the foregoing first time interval may also be predefined in a protocol. For example, one default time interval is defined for each of two scenarios that the BWP where the power-saving signal is located and the BWP where the PDCCH associated with the power-saving signal is located are the same or different.

The foregoing second time interval may also be predefined in a protocol. For example, one default time interval is defined for each of two scenarios that the BWP where the power-saving signal is located and the BWP where the CSI-RS used for downlink synchronization, RRM measurement or beam management is located are the same or different.

The foregoing third time interval may also be predefined in a protocol. For example, one default time interval is defined for each of two scenarios that the BWP where the PDCCH associated with the power-saving signal is located and the BWP where the CSI-RS used for downlink synchronization, RRM measurement or beam management is located are the same or different.

Figure 8:
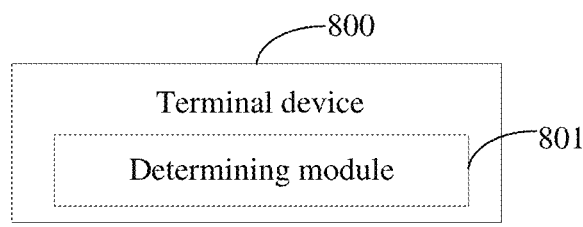
FIG. 8 is a structural diagram of a terminal device according to an embodiment of the present disclosure.

Referring to FIG. 8, FIG. 8 is a structural diagram of a terminal device according to an embodiment of the present disclosure. As shown in FIG. 8, a terminal device 800 includes:

a determining module 801, configured to determine, according to a measured measurement quantity related to a channel condition, whether to detect a power-saving signal.

Optionally, the measurement quantity related to a channel condition include at least one of reference signal received power RSRP, an measurement quantity related to a change of RSRP, reference signal received quality RSRQ, an measurement quantity related to a change of RSRQ, a signal-to-interference plus noise ratio SINR, a measurement quantity related to a change of SINR, or a measurement quantity related to mobility.

Optionally, the measurement quantity related to mobility includes at least one of:
a number of cells on which the terminal device camps during a first preset time;
a number of beams on which the terminal device camps during a second preset time;
a movement velocity of the terminal device;
a Doppler frequency shift of the terminal device; or
a number of transmission configuration indicator TCI states of the terminal device during a third preset time.

Optionally, the determining module is configured for at least one of:
detecting the power-saving signal in the case that the measured measurement quantity related to a channel condition satisfies a threshold requirement;
skipping requiring detecting the power-saving signal in the case that the measured measurement quantity related to a channel condition fails to satisfy a threshold; or
detecting a first physical downlink control channel PDCCH in the case that the measured measurement quantity related to a channel condition fails to satisfy a threshold, where the first PDCCH is a PDCCH associated with the power-saving signal.

Optionally, that the measured measurement quantity related to a channel condition satisfies a threshold requirement includes at least one of:
measured RSRP is larger than or equal to a first threshold;
measured RSRQ is larger than or equal to a second threshold;
a measured measurement quantity related to mobility satisfies a third threshold requirement;
a measured measurement quantity related to a change of RSRP satisfies a fourth threshold requirement;
a measured measurement quantity related to a change of RSRQ satisfies a fifth threshold requirement;
a measured SINR is larger than or equal to a sixth threshold; or
a measured measurement quantity related to a change of SINR satisfies a seventh threshold requirement.

Optionally, the threshold is configured on a network side or predefined in a protocol.

The terminal device 800 according to this embodiment of the present disclosure can implement the processes implemented by the terminal device in the foregoing power-saving signal detecting method embodiment. To avoid repetition, details are not described herein again.

In the terminal device 800 of this embodiment of the present disclosure, the determining module 801 is configured to determine, according to a measured measurement quantity related to a channel condition, whether to detect a power-saving signal. A way of detecting a power-saving signal is standardized, which can not only reduce power consumption of a terminal device, but also improve the communication reliability.

Figure 9:
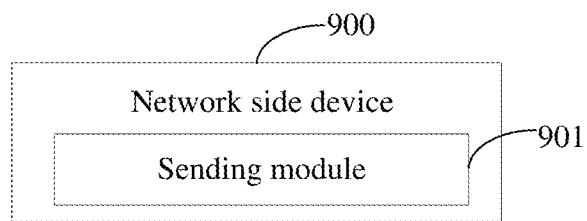
FIG. 9 is a structural diagram of a network side device according to an embodiment of the present disclosure.

Referring to FIG. 9, FIG. 9 is a structural diagram of a network side device according to an embodiment of the present disclosure. As shown in FIG. 9, a network side device 900 includes:

a sending module 901, configured to send a threshold for a measurement quantity related to a channel condition to a terminal device.

Optionally, the measurement quantity related to a channel condition include at least one of: reference signal received power RSRP, an measurement quantity related to a change of RSRP, reference signal received quality RSRQ, an measurement quantity related to a change of RSRQ, a signalto-interference plus noise ratio SINR, a measurement quantity related to a change of SINR, or a measurement quantity related to mobility.

Optionally, the measurement quantity related to mobility includes at least one of:
- a number of cells on which the terminal device camps during a first preset time;
- a number of beams on which the terminal device camps during a second preset time;
- a movement velocity of the terminal device;
- a Doppler frequency shift of the terminal device; or
- a number of transmission configuration indicator TCI states of the terminal device during a third preset time.

The network side device 900 according to this embodiment of the present disclosure can implement the processes implemented by the network side device in the foregoing power-saving signal detecting method embodiment. To avoid repetition, details are not described herein again.

In the network side device 900 according to this embodiment of the present disclosure, the sending module 901 is configured to send a threshold for a measurement quantity related to a channel condition to the terminal device, so that the terminal device can determine, based on the threshold for a measurement quantity related to a channel condition, whether to detect the power-saving signal.

Figure 10:
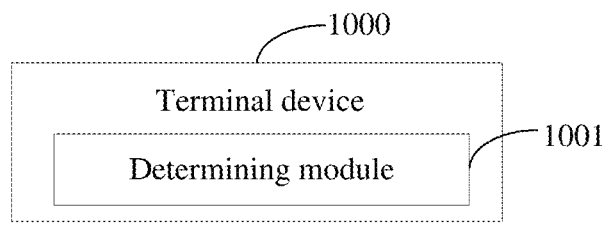
FIG. 10 is a structural diagram of a terminal device according to yet another embodiment of the present disclosure.

Referring to FIG. 10, FIG. 10 is a structural diagram of a terminal device according to yet another embodiment of the present disclosure. As shown in FIG. 10, a terminal device 1000 includes:
- a determining module 1001, configured to determine a time-domain resource for a target signal according to a target time interval;
- where the target time interval includes at least one of a first time interval, a second time interval, or a third time interval; where the first time interval is a time interval between a power-saving signal and a PDCCH associated with the power-saving signal, the second time interval is a time interval between the power-saving signal and a first signal, and the third time interval is a time interval between the PDCCH associated with the power-saving signal and the first signal, the first signal is a signal used for downlink synchronization or radio resource management RRM measurement or beam management, and the target signal includes at least one of the power-saving signal or the first signal.

Optionally, the target time interval is predefined in a protocol, or is configured by a network side device.

Optionally, the terminal device further includes:
- a sending module, configured to send capability information of the terminal device to a network side device before the determining a time domain resource for a target signal according to a target time interval;
- where the capability information includes at least one of a fourth time interval, a fifth time interval, or a sixth time interval; where the fourth time interval is a time interval between the power-saving signal and the PDCCH associated with the power-saving signal, the fifth time interval is a time interval between the power-saving signal and the first signal, and the sixth time interval is a time interval between the PDCCH associated with the power-saving signal and the first signal.

Optionally, the target time interval is configured by the network side device based on the capability information of the terminal device.

Optionally, the first time interval or the fourth time interval includes at least two different time intervals;
where the two different time intervals correspond to a first scenario and a second scenario respectively, where the first scenario is that a bandwidth part BWP where the power-saving signal is located is different from a BWP where the PDCCH associated with the power-saving signal is located, and the second scenario is that a BWP where the power-saving signal is located is the same as a BWP where the PDCCH associated with the power-saving signal is located.

Optionally, the second time interval or the fifth time interval includes at least two different time intervals;
where the two different time intervals correspond to a third scenario and a fourth scenario respectively, where the third scenario is that a BWP where the power-saving signal is located is different from a BWP where the first signal is located, and the fourth scenario is that a BWP where the power-saving signal is located is the same as a BWP where the first signal is located.

Optionally, the third time interval or the sixth time interval includes at least two different time intervals;
where the two different time intervals correspond to a fifth scenario and a sixth scenario respectively, where the fifth scenario is that a BWP where the PDCCH associated with the power-saving signal is located is different from a BWP where the first signal is located, and the sixth scenario is that a BWP where the PDCCH associated with the power-saving signal is located is the same as a BWP where the first signal is located.

Optionally, the power-saving signal is a signal transmitted on a PDCCH or a sequence-based signal.

Optionally, the power-saving signal and the first signal are different signals in the case that the power-saving signal is a sequence-based signal.

Optionally, the sequence-based signal includes one of the following: a channel state information reference signal CSI-RS, a primary synchronization signal PSS, a secondary synchronization signal SSS, a tracking reference signal TRS, and a demodulation reference signal DMRS.

The terminal device 1000 according to this embodiment of the present disclosure can implement the processes implemented by the terminal device in the foregoing resource determining method embodiment. To avoid repetition, details are not described herein again.

In the terminal device 1000 according to this embodiment of the present disclosure, the determining module 1001 is configured to determine a time-domain resource for a target signal according to a target time interval; where the target time interval includes at least one of a first time interval, a second time interval, or a third time interval; where the first time interval is a time interval between a power-saving signal and a PDCCH associated with the power-saving signal, the second time interval is a time interval between the power-saving signal and a first signal, and the third time interval is a time interval between the PDCCH associated with the power-saving signal and the first signal, the first signal is a signal used for downlink synchronization or radio resource management RRM measurement or beam management, and the target signal includes at least one of the power-saving signal or the first signal. A way of determining a resource related to power-saving signal detecting is standardized, so as to facilitate subsequent reception of a power-saving signal.

Figure 11:
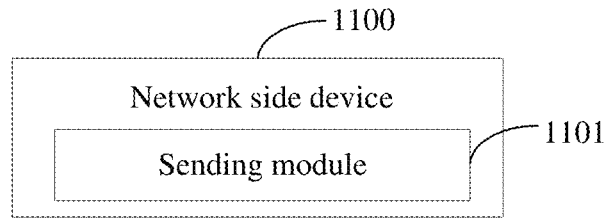
FIG. 11 is a structural diagram of a network side device according to yet another embodiment of the present disclosure.

Referring to FIG. 11, FIG. 11 is a structural diagram of a network side device according to yet another embodiment of the present disclosure. As shown in FIG. 11, the network side device 1100 includes:

a first sending module 1101, configured to send a target time interval to a terminal device;

where the target time interval includes at least one of a first time interval, a second time interval, or a third time interval; where the first time interval is a time interval between a power-saving signal and a PDCCH associated with the power-saving signal, the second time interval is a time interval between the power-saving signal and a first signal, and the third time interval is a time between the PDCCH associated with the power-saving signal and the first signal, the first signal is a sequence signal used for downlink synchronization or radio resource management RRM measurement or beam management.

Optionally, the network side device further includes:

a receiving module, configured to receive capability information of the terminal device from the terminal device;

where the capability information includes at least one of a fourth time interval, a fifth time interval, or a sixth time interval; where the fourth time interval is a time interval between the power-saving signal and the PDCCH associated with the power-saving signal, the fifth time interval is a time interval between the power-saving signal and the first signal, and the sixth time interval is a time interval between the PDCCH associated with the power-saving signal and the first signal.

Optionally, the target time interval is determined according to the capability information of the terminal device.

Optionally, the first time interval or the fourth time interval includes at least two different time intervals;

where the two different time intervals correspond to a first scenario and a second scenario respectively, where the first scenario is that a bandwidth part BWP where the power-saving signal is located is different from a BWP where the PDCCH associated with the power-saving signal is located, and the second scenario is that a BWP where the power-saving signal is located is the same as a BWP where the PDCCH associated with the power-saving signal is located.

Optionally, the second time interval or the fifth time interval includes at least two different time intervals;

where the two different time intervals correspond to a third scenario and a fourth scenario respectively, where the third scenario is that a BWP where the power-saving signal is located is different from a BWP where the first signal is located, and the fourth scenario is that a BWP where the power-saving signal is located is the same as a BWP where the first signal is located.

Optionally, the third time interval or the sixth time interval includes at least two different time intervals;

where the two different time intervals correspond to a fifth scenario and a sixth scenario respectively, where the fifth scenario is that a BWP where the PDCCH associated with the power-saving signal is located is different from a BWP where the first signal is located, and the sixth scenario is that a BWP where the PDCCH associated with the power-saving signal is located is the same as a BWP where the first signal is located.

Optionally, the power-saving signal is a signal transmitted on a PDCCH or a sequence-based signal.

Optionally, the power-saving signal and the first signal are different signals in the case that the power-saving signal is a sequence-based signal.

Optionally, the sequence-based signal includes one of the following: a channel state information reference signal CSI-RS, a primary synchronization signal PSS, a secondary synchronization signal SSS, a tracking reference signal TRS, and a demodulation reference signal DMRS.

The network side device 1100 according to this embodiment of the present disclosure can implement the processes implemented by the network side device in the foregoing resource determining method embodiment. To avoid repetition, details are not described herein again.

In the network side device 1100 according to this embodiment of the present disclosure, the sending module 1101 is configured to send a target time interval to a terminal device; where the target time interval includes at least one of a first time interval, a second time interval, or a third time interval; where the first time interval is a time interval between a power-saving signal and a PDCCH associated with the power-saving signal, the second time interval is a time interval between the power-saving signal and a first signal, and the third time interval is a time between the PDCCH associated with the power-saving signal and the first signal, the first signal is a sequence signal used for downlink synchronization or radio resource management RRM measurement or beam management. By sending a target time interval to a terminal device, the terminal device can determine at least one of a time-domain resource for a power-saving signal or a time-domain resource for a first signal based on the target time interval, so as to facilitate reception of the power-saving signal by the terminal device.

Figure 12:
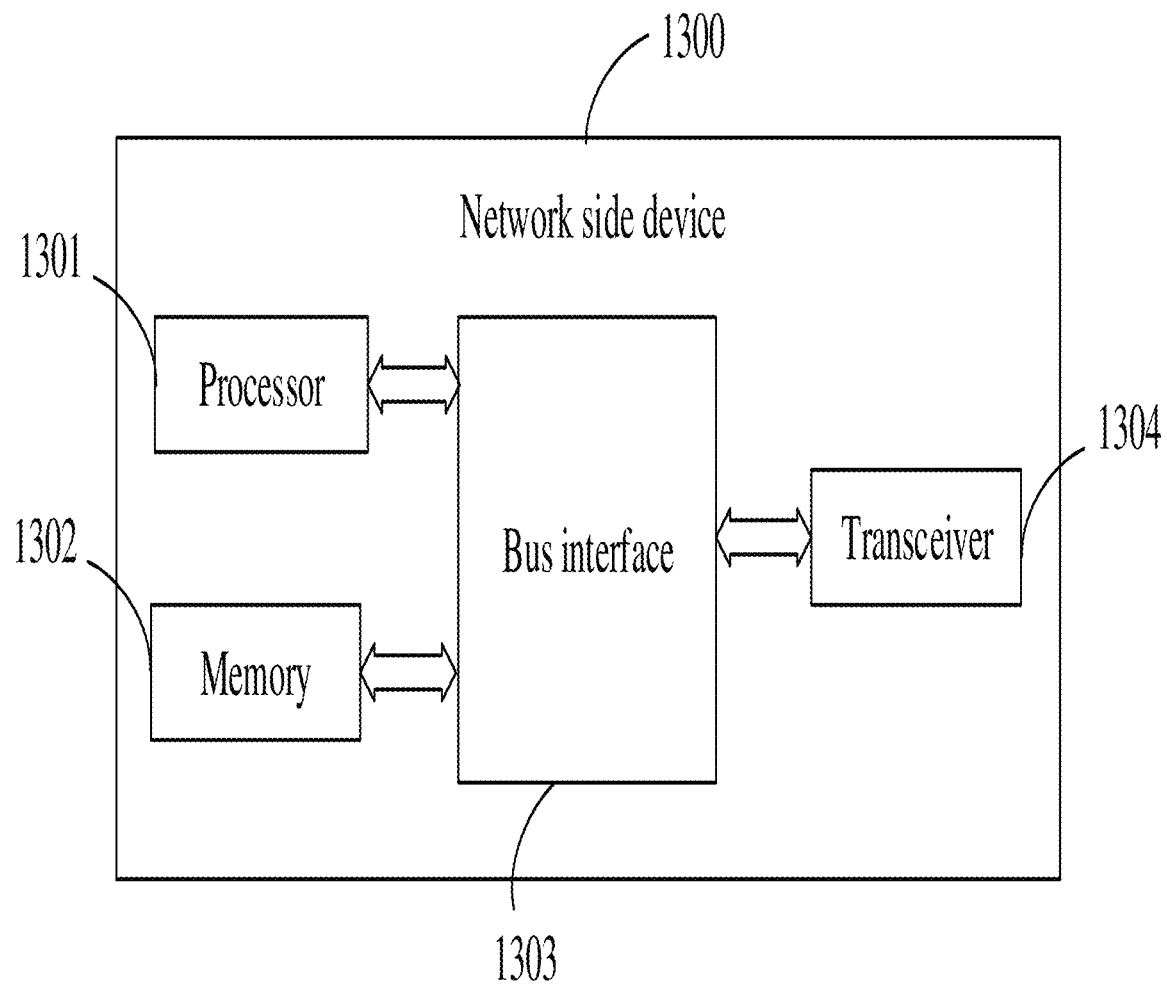
FIG. 12 is a structural diagram of a terminal device according to yet another embodiment of the present disclosure.

FIG. 12 is a structural diagram of a terminal device according to yet another embodiment of the present disclosure. Referring to FIG. 12, a terminal device 1200 includes but is not limited to components such as a radio frequency unit 1201, a network module 1202, an audio output unit 1203, an input unit 1204, a sensor 1205, a display unit 1206, a user input unit 1207, an interface unit 1208, a memory 1209, a processor 1210, and a power supply 1211. A person skilled in the art may understand that the structure of the terminal device shown in FIG. 12 does not constitute a limitation to the terminal device. The terminal device may include more or fewer components than that shown in the figure, or a combination of some components, or an arrangement of different components. In this embodiment of the present disclosure, the terminal device includes but is not limited to a mobile phone, a tablet computer, a notebook computer, a palmtop computer, a vehicle-mounted terminal, a wearable device, a pedometer, or the like.

Among them, the processor 1210 is configured to determine, according to a measured measurement quantity related to a channel condition, whether to detect a power-saving signal.

This embodiment of the present disclosure determines, according to a measured measurement quantity related to a channel condition, whether to detect a power-saving signal, and standardizes a way of detecting a power-saving signal, which can not only reduce power consumption of a terminal device, but also improve the communication reliability.

Optionally, the measurement quantity related to a channel condition include at least one of: reference signal received power RSRP, an measurement quantity related to a change of RSRP, reference signal received quality RSRQ, an measurement quantity related to a change of RSRQ, a signal-to-interference plus noise ratio SINR, a measurement quantity related to a change of SINR, or a measurement quantity related to mobility.

Optionally, the measurement quantity related to mobility includes at least one of:

a number of cells on which the terminal device camps during a first preset time;

a number of beams on which the terminal device camps during a second preset time;
a movement velocity of the terminal device;
a Doppler frequency shift of the terminal device; or
a number of transmission configuration indicator TCI states of the terminal device during a third preset time.

Optionally, the processor 1210 is further configured to implement at least one of:
detecting the power-saving signal in the case that the measured measurement quantity related to a channel condition satisfies a threshold requirement;
skipping requiring detecting the power-saving signal in the case that the measured measurement quantity related to a channel condition fails to satisfy a threshold; or
detecting a first physical downlink control channel PDCCH in the case that the measured measurement quantity related to a channel condition fails to satisfy a threshold, where the first PDCCH is a PDCCH associated with the power-saving signal.

Optionally, that the measured measurement quantity related to a channel condition satisfies a threshold requirement includes at least one of:
measured RSRP is larger than or equal to a first threshold;
measured RSRQ is larger than or equal to a second threshold;
a measured measurement quantity related to mobility satisfies a third threshold requirement;
a measured measurement quantity related to a change of RSRP satisfies a fourth threshold requirement;
a measured measurement quantity related to a change of RSRQ satisfies a fifth threshold requirement;
a measured SINR is larger than or equal to a sixth threshold; or
a measured measurement quantity related to a change of SINR satisfies a seventh threshold requirement.

Optionally, the threshold is configured on a network side or predefined in a protocol.

It should be understood that in this embodiment of the present disclosure, the radio frequency unit 1201 may be configured to receive and send signals in an information receiving and sending process or a calling process. For example, after receiving downlink data from a base station, the radio frequency unit 1201 sends the downlink data to the processor 1210 for processing, and sends uplink data to the base station. Usually, the radio frequency unit 1201 includes, but not limited to, an antenna, at least one amplifier, a transceiver, a coupler, a low noise amplifier, and a duplexer. In addition, the radio frequency unit 1201 may communicate with a network and another device by using a wireless communications system.

The terminal device provides a user with wireless broadband Internet access through the network module 1202, for example, helps the user send and receive emails, browse web pages, and access streaming media.

The audio output unit 1203 may convert audio data received by the radio frequency unit 1201 or the network module 1202 or stored in the memory 1209 into an audio signal and output the audio signal as a sound. In addition, the audio output unit 1203 may further provide audio output (for example, call signal receiving sound or message receiving sound) related to a specific function performed by the terminal device 1200. The audio output unit 1203 includes a speaker, a buzzer, a telephone receiver, and the like.

The input unit 1204 is configured to receive audio or video signals. The input unit 1204 may include a graphics processor (GPU) 12041 and a microphone 12042, and the graphics processing unit 12041 processes image data of a still picture or a video obtained by an image capture apparatus (for example, a camera) in an image capture mode or a video capture mode. A processed image frame can be displayed on the display unit 1206. An image frame processed by the graphics processing unit 12041 may be stored in the memory 1209 (or another storage medium) or sent by the radio frequency unit 1201 or the network module 1202. The microphone 12042 may receive a sound and can process such sound into audio data. The processed audio data may be converted, in a call mode, into a format that can be sent by using the radio frequency unit 1201 to a mobile communication base station, for outputting.

The terminal device 1200 further includes at least one sensor 1205, such as an optical sensor, a motion sensor, and other sensors. For example, the optical sensor includes an ambient light sensor and a proximity sensor. The ambient light sensor may adjust luminance of the display panel 12061 based on brightness of ambient light. The proximity sensor may turn off the display panel 12061 and/or backlight when the terminal device 1200 approaches an ear. As a type of the motion sensor, an accelerometer sensor may detect an acceleration in each direction (generally, three axes), and detect a value and a direction of gravity when the accelerometer sensor is static, and may be configured to recognize a terminal device posture (such as screen switching between landscape and portrait modes, a related game, or magnetometer posture calibration), a function related to vibration recognition (such as a pedometer or a knock), and the like. The sensor 1205 may further include a fingerprint sensor, a pressure sensor, an iris sensor, a molecular sensor, a gyroscope, a barometer, a hygrometer, a thermometer, and an infrared sensor. Details are not described herein.

The display unit 1206 is configured to display information entered by a user or information provided for a user. The display unit 1206 may include the display panel 12061, and the display panel 12061 may be configured in a form of a liquid crystal display (LCD), an organic light-emitting diode (OLED), or the like.

The user input unit 1207 may be configured to receive input numeral or character information, and generate key signal input related to user setting and function control of the terminal device. For example, the user input unit 1207 includes a touch panel 12071 and another input device 12072. The touch panel 12071 is also referred to as a touchscreen, and may collect a touch operation of the user on or near the touch panel (for example, an operation performed on or near the touch panel 12071 by the user by using any appropriate object or accessory such as a finger or a stylus). The touch panel 12071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into touch point coordinates, sends the touch point coordinates to the processor the processor 1210, and receives and executes a command from the processor 1210. In addition, the touch panel 12071 may be implemented by using a plurality of types such as a resistive type, a capacitive type, an infrared ray, and a surface acoustic wave. The user input unit 1207 may include the another input device 12072 in addition to the touch panel 12071. For example, the another input device 12072 may include, but is not limited to, a physical keyboard, function keys (such as a volume control key and a switch key), a trackball, a mouse, and a joystick. Details are not described herein.

The touch panel 12071 may cover the display panel 12061. When detecting the touch operation on or near the touch panel 12071, the touch panel 12071 transmits the touch operation to the processor 1210 to determine a type of a touch event, and then the processor 1210 provides corresponding visual output on the display panel 12061 based on the type of the touch event. Although in FIG. 12, the touch panel 12071 and the display panel 12061 are configured as two independent components to implement input and output functions of the terminal device, in some embodiments, the touch panel 12071 and the display panel 12061 can be integrated to implement the input and output functions of the terminal device. Details are not limited herein.

The interface unit 1208 is an interface for connecting an external apparatus to the terminal device 1200. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 1208 may be configured to receive an input (for example, data information or power) from an external apparatus and transmit the received input to one or more elements in the terminal device 1200, or transmit data between the terminal device 1200 and the external apparatus.

The memory 1209 may be configured to store a software program and various data. The memory 1209 may mainly include a program storage area and a data storage area. The program storage area may store an operating system, an application program required for at least one function (such as an audio playing function and an image playing function, etc.) etc. The data storage area may store data (such as audio data and a phone book, etc.) created according to use of the mobile phone. In addition, the memory 1209 may include a high speed random access memory, and may further include a non-volatile memory, such as at least one magnetic disk memory device, a flash memory device, or other non-volatile solid state memory devices.

The processor 1210 is a control center of the terminal device. The processor 1210 uses various interfaces and lines to connect all parts of the entire terminal device, and performs various functions and data processing of the terminal device by running or executing the software program and/or module stored in the memory 1209 and invoking data stored in the memory 1209, thereby performing overall monitoring on the terminal device. The processor 1210 may include one or more processing units. Optionally, an application processor and a modem processor may be integrated into the processor 1210. The application processor mainly processes an operating system, a user interface, an application, and the like. The modem processor mainly processes wireless communication. It may be understood that the foregoing modem processor may not be integrated into the processor 1210.

The terminal device 1200 may further include the power supply 1211 (such as a battery) supplying power to each component. Preferably, the power supply 1211 may be logically connected to the processor 1210 by using a power management system, so as to implement functions such as charging management, discharging management and power consumption management by using the power management system.

In addition, the terminal device 1200 includes some functional modules that are not shown. Details are not described herein.

Optionally, an embodiment of the present disclosure further provides a terminal device, including a processor 1210, a memory 1209, and a computer program stored in the memory 1209 and executable on the processor 1210. When the computer program is executed by the processor 1210, each process of the embodiments of the foregoing power-saving signal detecting method is implemented, and the same technical effect can be achieved. To avoid repetition, details are not described herein again.

Figure 13:
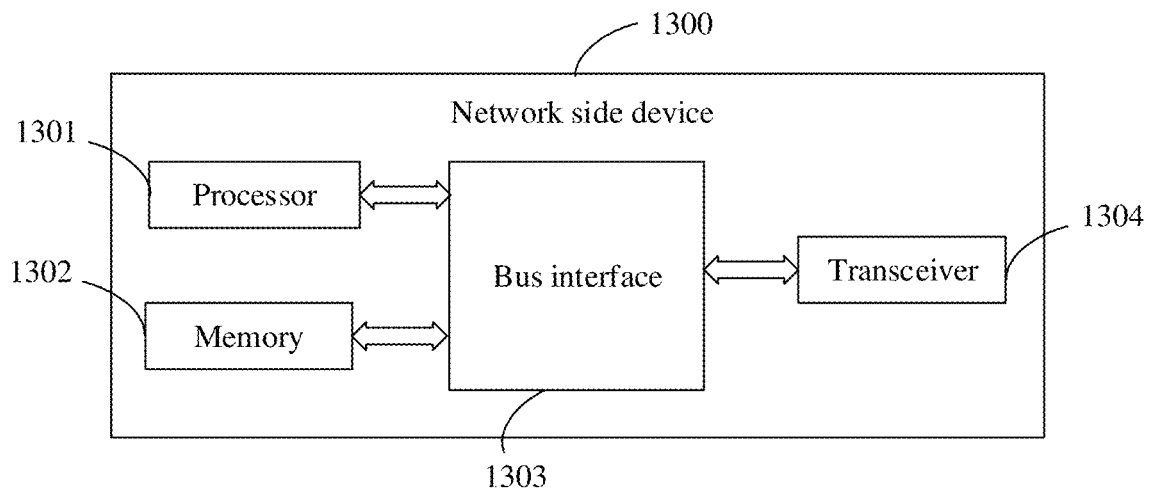
FIG. 13 is a structural diagram of a network side device according to yet another embodiment of the present disclosure.

Referring to FIG. 13, FIG. 13 is a structural diagram of a network side device according to yet another embodiment of the present disclosure. As shown in FIG. 13, a network side device 1300 includes a processor 1301, a memory 1302, a bus interface 1303, and a transceiver 1304, where the processor 1301, the memory 1302, and the transceiver 1304 are all connected to the bus interface 1303.

In this embodiment of the present disclosure, the network side device 1300 further includes a computer program that is stored in the memory 1302 and executable on the processor 1301.

In this embodiment of the present disclosure, the transceiver 1304 is configured to send a threshold for a measurement quantity related to a channel condition to a terminal device.

Optionally, the measurement quantity related to a channel condition include at least one of: reference signal received power RSRP, an measurement quantity related to a change of RSRP, reference signal received quality RSRQ, an measurement quantity related to a change of RSRQ, a signal-to-interference plus noise ratio SINR, a measurement quantity related to a change of SINR, or a measurement quantity related to mobility.

Optionally, the measurement quantity related to mobility includes at least one of:
 a number of cells on which the terminal device camps during a first preset time;
 a number of beams on which the terminal device camps during a second preset time;
 a movement velocity of the terminal device;
 a Doppler frequency shift of the terminal device; or
 a number of transmission configuration indicator TCI states of the terminal device during a third preset time.

The embodiments of the present disclosure further provide a non-transitory computer-readable storage medium. The non-transitory computer-readable storage medium stores a computer program, and when a processor executes the computer program, the processes of the foregoing power-saving signal detecting method embodiment are implemented and the same technical effect can be achieved. To avoid repetition, details are not described herein again. The non-transitory computer-readable storage medium includes a read-only memory (ROM), a random access memory (RAM), a magnetic disk, an optical disc, or the like.

Figure 14:
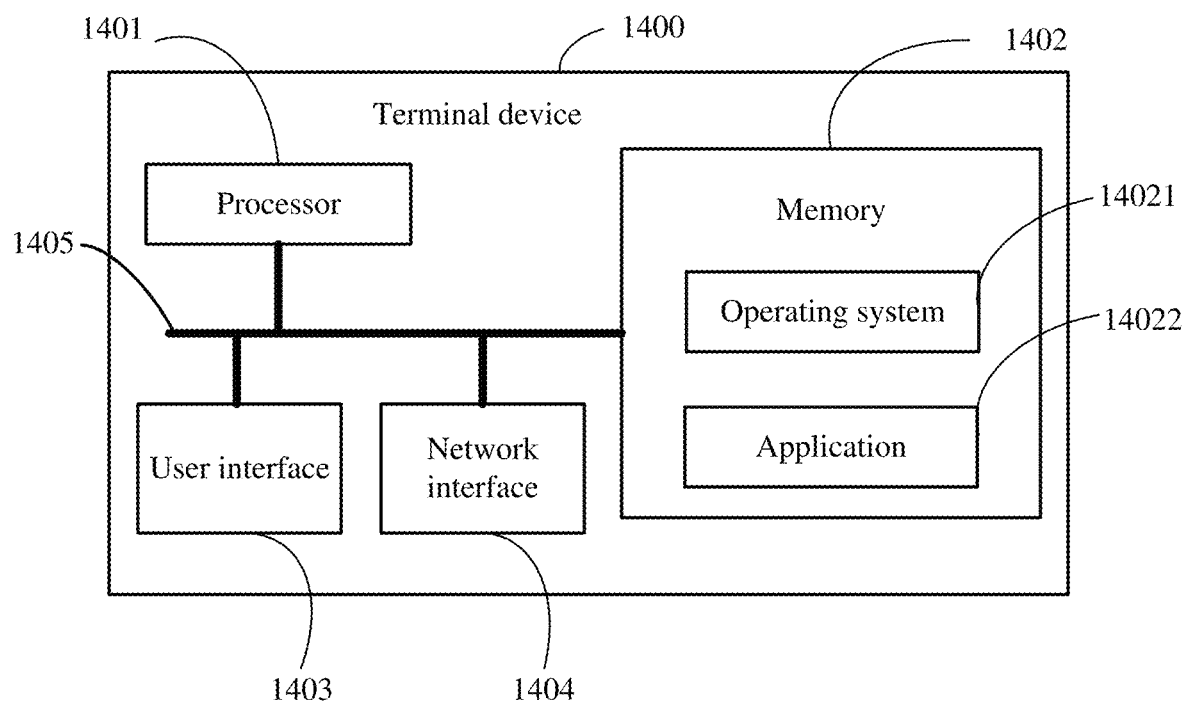
FIG. 14 is a structural diagram of a terminal device according to yet another embodiment of the present disclosure.

Referring to FIG. 14, FIG. 14 is a structural diagram of a terminal device according to yet another embodiment of the present disclosure. As shown in FIG. 14, a terminal device 1400 includes: at least one of a processor 1401, a memory 1402, at least one network interface 1404, or a user interface 1403. The components in the terminal device 1400 are coupled together through a bus system 1405. It may be understood that the bus system 1405 is configured to implement connection and communication between these components. In addition to a data bus, the bus system 1405 also includes a power bus, a control bus, and a status signal bus.

In some implementations, the memory 1402 stores the following element: an executable module or a data structure, a subset thereof, or an extended set thereof: an operating system 14021 and an application program 14022.

The operating system 14021 includes various system programs, such as a framework layer, a core library layer, and a driver layer, and is configured to implement various basic services and process hardware-based tasks. The application program 14022 includes various application programs, for example, a media player and a browser, and is configured to implement various application services. A program implementing the method in the embodiments of the present disclosure may be included in the application program 14022.

In this embodiment of the present disclosure, the terminal device 1400 further includes: a computer program stored in the memory 1402 and executable on the processor 1401, which may be a computer program in the application program 14022. When the computer program is executed by the processor 1401, the following step is implemented:
  determining a time-domain resource for a target signal according to a target time interval;
  where the target time interval includes at least one of a first time interval, a second time interval, or a third time interval; where the first time interval is a time interval between a power-saving signal and a PDCCH associated with the power-saving signal, the second time interval is a time interval between the power-saving signal and a first signal, and the third time interval is a time interval between the PDCCH associated with the power-saving signal and the first signal, the first signal is a signal used for downlink synchronization or radio resource management RRM measurement or beam management, and the target signal includes at least one of the power-saving signal or the first signal.

Optionally, the target time interval is predefined in a protocol, or is configured by a network side device.

Optionally, when being executed by the processor 1401, the computer program is further configured to:
  send capability information of the terminal device to a network side device before the determining a time domain resource for a target signal according to a target time interval;
  where the capability information includes at least one of a fourth time interval, a fifth time interval, or a sixth time interval; where the fourth time interval is a time interval between the power-saving signal and the PDCCH associated with the power-saving signal, the fifth time interval is a time interval between the power-saving signal and the first signal, and the sixth time interval is a time interval between the PDCCH associated with the power-saving signal and the first signal.

Optionally, the target time interval is configured by the network side device based on the capability information of the terminal device.

Optionally, the first time interval or the fourth time interval includes at least two different time intervals;
  where the two different time intervals correspond to a first scenario and a second scenario respectively, where the first scenario is that a bandwidth part BWP where the power-saving signal is located is different from a BWP where the PDCCH associated with the power-saving signal is located, and the second scenario is that a BWP where the power-saving signal is located is the same as a BWP where the PDCCH associated with the power-saving signal is located.

Optionally, the second time interval or the fifth time interval includes at least two different time intervals;
  where the two different time intervals correspond to a third scenario and a fourth scenario respectively, where the third scenario is that a BWP where the power-saving signal is located is different from a BWP where the first signal is located, and the fourth scenario is that a BWP where the power-saving signal is located is the same as a BWP where the first signal is located.

Optionally, the third time interval or the sixth time interval includes at least two different time intervals;
  where the two different time intervals correspond to a fifth scenario and a sixth scenario respectively, where the fifth scenario is that a BWP where the PDCCH associated with the power-saving signal is located is different from a BWP where the first signal is located, and the sixth scenario is that a BWP where the PDCCH associated with the power-saving signal is located is the same as a BWP where the first signal is located.

Optionally, the power-saving signal is a signal transmitted on a PDCCH or a sequence-based signal.

Optionally, the power-saving signal and the first signal are different signals in the case that the power-saving signal is a sequence-based signal.

Optionally, the sequence-based signal includes one of the following: a channel state information reference signal CSI-RS, a primary synchronization signal PSS, a secondary synchronization signal SSS, a tracking reference signal TRS, and a demodulation reference signal DMRS.

Figure 15:
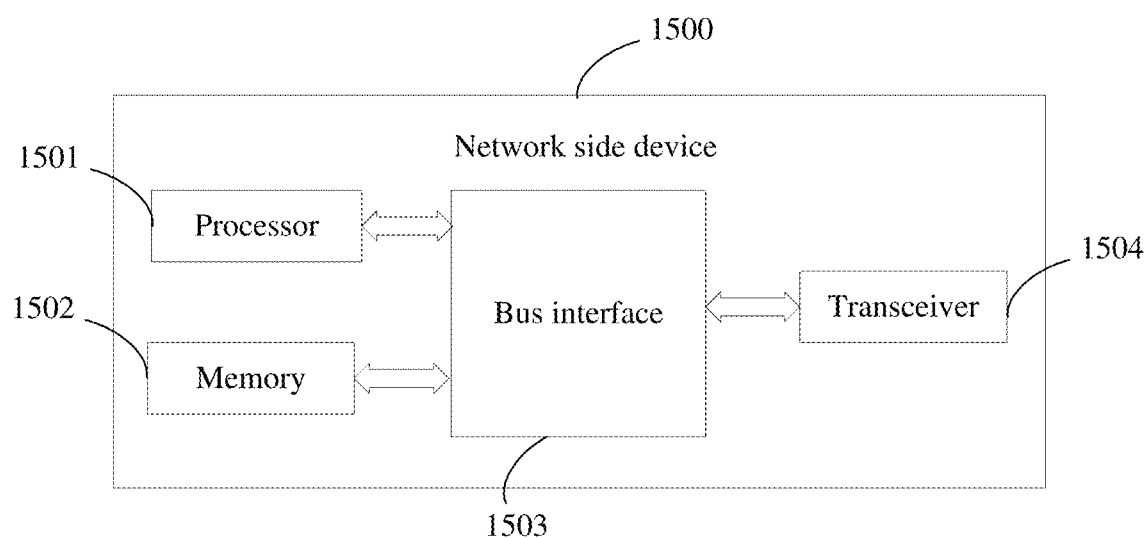
FIG. 15 is a structural diagram of a network side device according to yet another embodiment of the present disclosure.

Referring to FIG. 15, FIG. 15 is a structural diagram of a network side device according to yet another embodiment of the present disclosure. As shown in FIG. 15, a network side device 1500 includes a processor 1501, a memory 1502, a bus interface 1503, and a transceiver 1504, where the processor 1501, the memory 1502, and the transceiver 1504 are all connected to the bus interface 1503.

In this embodiment of the present disclosure, the network side device 1500 further includes a computer program that is stored in the memory 1502 and executable on the processor 1501.

In this embodiment of the present disclosure, the transceiver 1504 is configured to:
  sending a target time interval to a terminal device;
  where the target time interval includes at least one of a first time interval, a second time interval, or a third time interval; where the first time interval is a time interval between a power-saving signal and a PDCCH associated with the power-saving signal, the second time interval is a time interval between the power-saving signal and a first signal, and the third time interval is a time between the PDCCH associated with the power-saving signal and the first signal, the first signal is a sequence signal used for downlink synchronization or radio resource management RRM measurement or beam management.

Optionally, the transceiver 1504 is further configured to:
  receiving capability information of the terminal device from the terminal device;
  where the capability information includes at least one of a fourth time interval, a fifth time interval, or a sixth time interval; where the fourth time interval is a time interval between the power-saving signal and the PDCCH associated with the power-saving signal, the fifth time interval is a time interval between the power-saving signal and the first signal, and the sixth time interval is a time interval between the PDCCH associated with the power-saving signal and the first signal.

Optionally, the target time interval is determined according to the capability information of the terminal device.

Optionally, the first time interval or the fourth time interval includes at least two different time intervals;
where the two different time intervals correspond to a first scenario and a second scenario respectively, where the first scenario is that a bandwidth part BWP where the power-saving signal is located is different from a BWP where the PDCCH associated with the power-saving signal is located, and the second scenario is that a BWP where the power-saving signal is located is the same as a BWP where the PDCCH associated with the power-saving signal is located.

Optionally, the second time interval or the fifth time interval includes at least two different time intervals;
where the two different time intervals correspond to a third scenario and a fourth scenario respectively, where the third scenario is that a BWP where the power-saving signal is located is different from a BWP where the first signal is located, and the fourth scenario is that a BWP where the power-saving signal is located is the same as a BWP where the first signal is located.

Optionally, the third time interval or the sixth time interval includes at least two different time intervals;
where the two different time intervals correspond to a fifth scenario and a sixth scenario respectively, where the fifth scenario is that a BWP where the PDCCH associated with the power-saving signal is located is different from a BWP where the first signal is located, and the sixth scenario is that a BWP where the PDCCH associated with the power-saving signal is located is the same as a BWP where the first signal is located.

Optionally, the power-saving signal is a signal transmitted on a PDCCH or a sequence-based signal.

Optionally, the power-saving signal and the first signal are different signals in the case that the power-saving signal is a sequence-based signal.

Optionally, the sequence-based signal includes one of the following: a channel state information reference signal CSI-RS, a primary synchronization signal PSS, a secondary synchronization signal SSS, a tracking reference signal TRS, and a demodulation reference signal DMRS.

An embodiment of the present disclosure further provides a non-transitory computer-readable storage medium. A computer program is stored in the non-transitory computer-readable storage medium. When being executed by a processor, the computer program implements each process of the embodiment of the foregoing resource determining method, and a same technical effect can be achieved. To avoid repetition, details are not described herein. The non-transitory computer-readable storage medium is, for example, a read-only memory (ROM), a random access memory (RAM), a magnetic disk, or an optical disc.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by the statement "including a . . . " does not exclude another same element in a process, method, article, or apparatus that includes the element.

According to the foregoing descriptions of the implementations, a person skilled in the art may clearly understand that the foregoing methods in the embodiments may be implemented by using software plus a required universal hardware platform, or certainly may be implemented by using hardware. However, in many cases, the former is a better implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments according to this application, it should be understood that the disclosed device and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the devices or units may be implemented in electronic, mechanical, or other forms.

The units described as separate parts may or may not be physically separate, and parts displayed as units may or may not be physical units, that is, may be located in one location, or may be distributed on a plurality of network units. Some or all of the units may be selected based on actual requirements to achieve the objectives of the solutions of the embodiments.

In addition, functional units in each embodiment of the present disclosure may be integrated into one processing unit, or each unit may have separate physical existence, or two or more units may be integrated in one unit.

If the function is implemented in the form of software function units and sold or used as independent products, the function may be stored in a computer-readable storage medium. Based on such an understanding, the technical solutions of the present disclosure essentially, or the part contributing to the related art, or some of the technical solutions may be implemented in a form of a software product. The computer software product is stored in a storage medium, and includes several instructions for enabling a computer device (which may be a personal computer, a server, a network device, or the like) to perform all or some of the steps of the methods described in the embodiments of the present disclosure. The storage medium includes various mediums, such as a USB flash disk, a removable hard disk, a ROM, a RAM, a magnetic disk, or an optical disc, that can store program code.

Those of ordinary skill in the art can understand that some or all processes of the realization of the foregoing method in the embodiments can be implemented by controlling relevant hardware by the computer program. The foregoing program may be stored in a computer-readable storage medium, where when the program is executed, the processes of the embodiments of the foregoing methods can be included. The foregoing storage medium may include: a magnetic disk, an optical disc, a read-only memory (ROM), a random access memory (RAM), or the like.

It may be understood that the embodiments described in the embodiments of the present disclosure may be implemented by hardware, software, firmware, middleware, microcode, or a combination thereof. For implementation with hardware, the module, unit, and subunit may be implemented in one or more application specific integrated circuits (ASIC), a digital signal processor (DSP), a DSP device (DSPD), a programmable logic device (PLD), a field-programmable gate array (FPGA), general processors, controllers, micro-controllers, micro-processors, and other electronic units for implementing the functions of the present application, or their combinations.

For implementation by software, technologies described in the embodiments of the present disclosure may be implemented by executing functional modules (for example, a process and a function) in the embodiments of the present disclosure. Software code can be stored in the memory and executed by the processor. The memory can be implemented inside or outside the processor.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A resource determining method, comprising:
sending, by a terminal device, capability information of the terminal device to a network side device, the capability information comprising a time interval between a power saving signal and a Discontinuous Reception (DRX) OnDuration at which a physical downlink control channel (PDCCH) may be located;
receiving, by the terminal device, a target time interval from the network side device; and
determining, by the terminal device, a time-domain resource for the power-saving signal according to the target time interval;
wherein:
the target time interval comprises a first time interval between the power-saving signal and a DRX OnDuration at which the PDCCH may be located;
the first time interval or the time interval comprises at least two different time intervals;
the two different time intervals correspond to a first scenario and a second scenario respectively;
the first scenario is that a bandwidth part (BWP) where the power-saving signal is located is different from a BWP where a PDCCH associated with the power-saving signal is located;
the second scenario is that a BWP where the power-saving signal is located is the same as a BWP where the PDCCH associated with the power-saving signal is located; and
the PDCCH associated with the power-saving signal is the PDCCH located at the DRX OnDuration.

2. The method according to claim 1, wherein the target time interval is configured by the network side device based on the capability information of the terminal device.

3. The method according to claim 1, wherein the power-saving signal is a signal transmitted on a PDCCH or a sequence-based signal.

4. The method according to claim 3, wherein the sequence-based signal comprises one of the following: a channel state information reference signal (CSI-RS), a primary synchronization signal (PSS), a secondary synchronization signal (SSS), a tracking reference signal (TRS), and a demodulation reference signal (DMRS).

5. A resource determining method, comprising:
receiving, by a network side device, capability information of a terminal device from the terminal device, the capability information comprising a time interval between a power-saving signal and a DRX OnDuration at which a physical downlink control channel (PDCCH) may be located; and
sending, by the network side device, a target time interval to the terminal device;
wherein:
the target time interval comprises a first time interval between the power-saving signal and a DRX OnDuration at which the PDCCH may be located;
the first time interval or the time interval comprises at least two different time intervals;
the two different time intervals correspond to a first scenario and a second scenario respectively;
the first scenario is that a bandwidth part (BWP) where the power-saving signal is located is different from a BWP where a PDCCH associated with the power-saving signal is located;
the second scenario is that a BWP where the power-saving signal is located is the same as a BWP where the PDCCH associated with the power-saving signal is located; and
the PDCCH associated with the power-saving signal is the PDCCH located at the DRX OnDuration.

6. The method according to claim 5, wherein the target time interval is determined according to the capability information of the terminal device.

7. The method according to claim 5, wherein the power-saving signal is a signal transmitted on a PDCCH or a sequence-based signal.

8. The method according to claim 7, wherein the sequence-based signal comprises one of the following: a channel state information reference signal (CSI-RS), a primary synchronization signal (PSS), a secondary synchronization signal (SSS), a tracking reference signal (TRS), and a demodulation reference signal (DMRS).

9. A network side device, comprising a processor, a memory, and a computer program that is stored in the memory and executable on the processor, wherein the computer program, when executed by the processor, causes the network side device to perform the method according to claim 5.

10. A terminal device, comprising a processor, a memory, and a computer program that is stored in the memory and executable on the processor, wherein the computer program, when executed by the processor, causes the terminal device to perform:

sending capability information of the terminal device to a network side device, the capability information comprising a time interval between a power saving signal and a Discontinuous Reception (DRX) OnDuration at which a physical downlink control channel (PDCCH) may be located;

receiving a target time interval from the network side device; and determining a time-domain resource for the power-saving signal according to the target time interval;

wherein:

the target time interval comprises a first time interval between the power-saving signal and a DRX OnDuration at which the PDCCH may be located;

the first time interval or the time interval comprises at least two different time intervals;

the two different time intervals correspond to a first scenario and a second scenario respectively;

the first scenario is that a bandwidth part (BWP) where the power-saving signal is located is different from a BWP where a PDCCH associated with the power-saving signal is located;

the second scenario is that a BWP where the power-saving signal is located is the same as a BWP where the PDCCH associated with the power-saving signal is located; and the PDCCH associated with the power-saving signal is the PDCCH that may be located at the DRX OnDuration.

11. The terminal device according to claim 10, wherein the power-saving signal is a signal transmitted on a PDCCH or a sequence-based signal.

12. The terminal device according to claim 11, wherein the sequence-based signal comprises one of the following: a channel state information reference signal (CSI-RS), a primary synchronization signal (PSS), a secondary synchronization signal (SSS), a tracking reference signal (TRS), and a demodulation reference signal (DMRS).

\* \* \* \* \*